(12) United States Patent
Tagawa et al.

(10) Patent No.: US 8,718,237 B2
(45) Date of Patent: *May 6, 2014

(54) MOBILE PHONE WITH MUSIC REPRODUCTION FUNCTION, MUSIC DATA REPRODUCTION METHOD BY MOBILE PHONE WITH MUSIC REPRODUCTION FUNCTION, AND THE PROGRAM THEREOF

(75) Inventors: Kenji Tagawa, Katano (JP); Takashi Hiraoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 526 days.

This patent is subject to a terminal disclaimer.

(21) Appl. No.: 12/959,727

(22) Filed: Dec. 3, 2010

(65) Prior Publication Data

US 2011/0077049 A1 Mar. 31, 2011

Related U.S. Application Data

(62) Division of application No. 11/166,166, filed on Jun. 27, 2005, now Pat. No. 7,869,580, which is a division of application No. 09/973,798, filed on Oct. 11, 2001, now Pat. No. 6,947,728.

(30) Foreign Application Priority Data

Oct. 13, 2000 (JP) ................................. 2000-313151

(51) Int. Cl.
*H04M 11/00* (2006.01)
*H04M 3/42* (2006.01)
*H04M 1/64* (2006.01)

(52) U.S. Cl.
USPC ................. 379/78; 379/88.13; 455/414.4

(58) Field of Classification Search
USPC ....................................... 379/70, 78, 88.13
See application file for complete search history.

(56) References Cited

U.S. PATENT DOCUMENTS

| 5,974,333 | A  | * | 10/1999 | Chen ........................... 455/569.2 |
| 6,023,700 | A  | * | 2/2000  | Owens et al. ........................ 1/1 |
| 6,192,340 | B1 | * | 2/2001  | Abecassis ..................... 704/270 |
| 6,407,325 | B2 | * | 6/2002  | Yi et al. ........................ 84/610 |

(Continued)

FOREIGN PATENT DOCUMENTS

| EP | 0 795 845 | 9/1997 |
| EP | 0 867 844 | 9/1998 |

(Continued)

OTHER PUBLICATIONS

International Search Report mailed Jan. 6, 2003 in International Application No. PCT/JP01/09020.

(Continued)

*Primary Examiner* — Joseph T Phan
(74) *Attorney, Agent, or Firm* — Wenderoth, Lind & Ponack, L.L.P.

(57) ABSTRACT

A mobile phone 100 with music reproduction function comprising a reproduction unit 106 that reproduces music data and a ring tone which are recorded in a music data recording medium 105 and a ring tone, a communication unit 108 that detects an incoming call from outside and a control unit 103 that instructs the reproduction unit 106 to perform a fade-out process of reproducing music data and to perform a fade-in process of outputting a ring tone when the communication unit 108 detects an incoming call while the reproduction unit 106 is reproducing music data.

9 Claims, 14 Drawing Sheets

(56) References Cited

U.S. PATENT DOCUMENTS

| | | | |
|---|---|---|---|
| 6,495,747 B2 * | 12/2002 | Shimaya et al. | 84/477 R |
| 6,694,012 B1 * | 2/2004 | Posthuma | 379/393 |
| 6,947,728 B2 * | 9/2005 | Tagawa et al. | 455/414.1 |
| 7,869,580 B2 | 1/2011 | Tagawa et al. | |
| 2001/0049262 A1 * | 12/2001 | Lehtonen | 455/41 |
| 2002/0068610 A1 * | 6/2002 | Anvekar et al. | 455/560 |

FOREIGN PATENT DOCUMENTS

| | | |
|---|---|---|
| GB | 2 308 038 | 6/1997 |
| GB | 2 308 775 | 7/1997 |
| JP | 01-109850 | 4/1989 |
| JP | 02-294985 | 12/1990 |
| JP | 07-023081 | 1/1995 |
| JP | 07-121930 | 5/1995 |
| JP | 09 321844 | 12/1997 |
| JP | 10-320892 | 12/1998 |
| JP | 11-168534 | 6/1999 |
| JP | 2000-106593 | 4/2000 |
| WO | 99/00962 | 1/1999 |
| WO | 99/43136 | 8/1999 |
| WO | 00/64129 | 10/2000 |
| WO | 01/15410 | 3/2001 |

OTHER PUBLICATIONS

Patent Abstracts of Japan, entitled "*Portable Telephone Set*", vol. 1999, No. 09, Jul. 30, 1999 & JP 11 112615 A (Kokusai Electric Co. Ltd.), Apr. 23, 1999.
Patent Abstracts of Japan, entitled "*Telephone Set Equipped With Sound Recording and Reproducing Circuit*", vol. 012, No. 461 (E-689), Dec. 5, 1988 & JP 63 184447 A (NEC Corp), Jul. 29, 1988.
"Phone Mail Override for Incoming Calls", IBM Technical Disclosure Bulletin, IBM Corp., New York, U.S., vol. 37, No. 11, Nov. 1, 1994, p. 543-544.
Patent Abstracts of Japan, entitled "*Portable Telephone Set*", vol. 017, No. 013 (E-1304), Jan. 11, 1993 & JP 04 243358 A (Sony Corp), Aug. 31, 1992.
Patent Abstracts of Japan, entitled "*Music Sound Common Listening Speech Device*", vol. 2000, No. 21, Aug. 3, 2001 & JP 2001 119776 A (Mega House: KK), Apr. 27, 2001.

* cited by examiner

Fig. 6

| resume file name (401) | incoming call reproduction position information (402) |
|---|---|
| Song01.aac | 1234 |

Fig.8

| resume pattern | incoming call reproduction position information | resume position information |
|---|---|---|
| ① | 1234 | 1234 |
| ② | 1234 | 765 |
| ③ | 1234 | 0 |

601  602  603

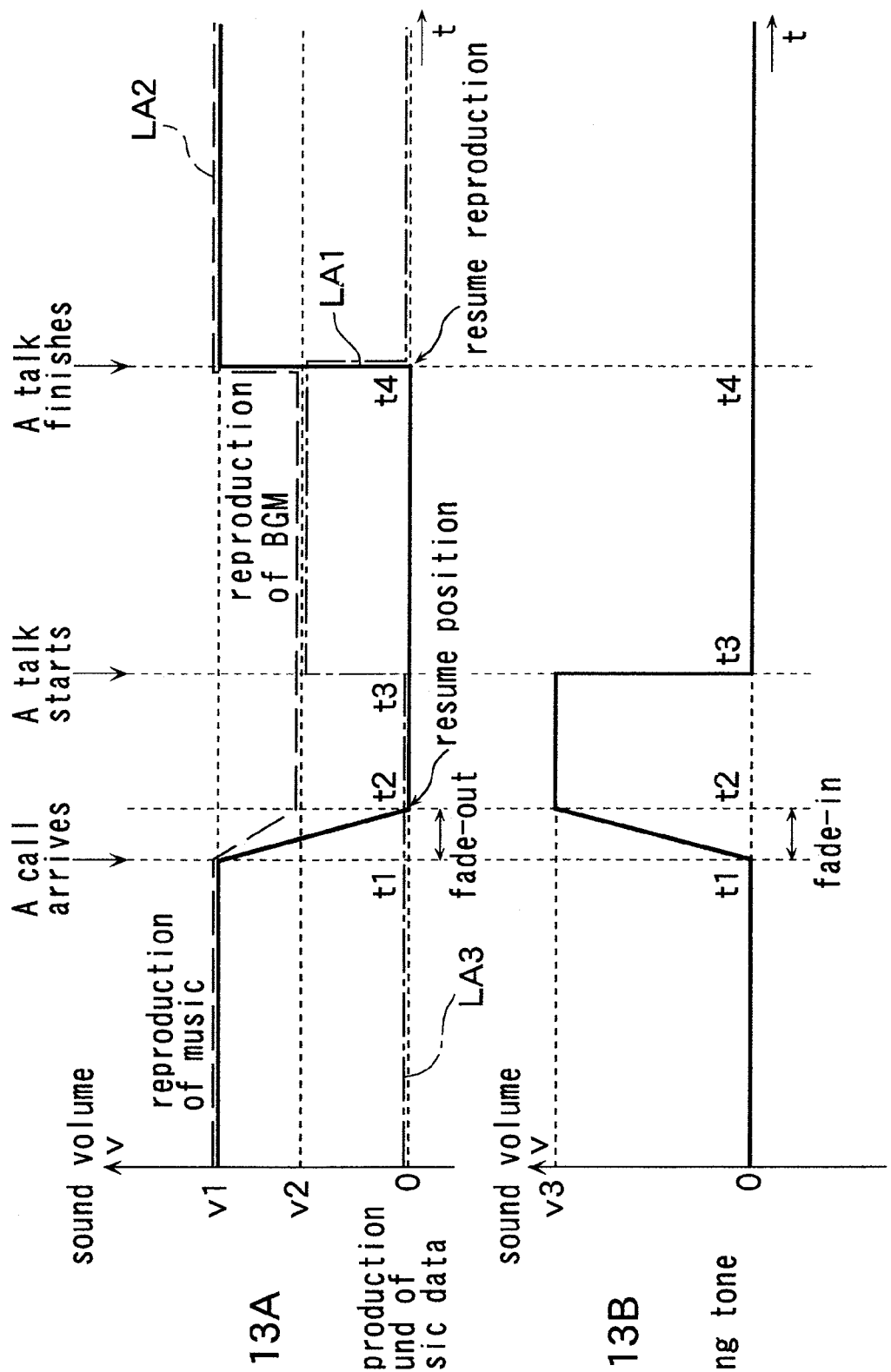

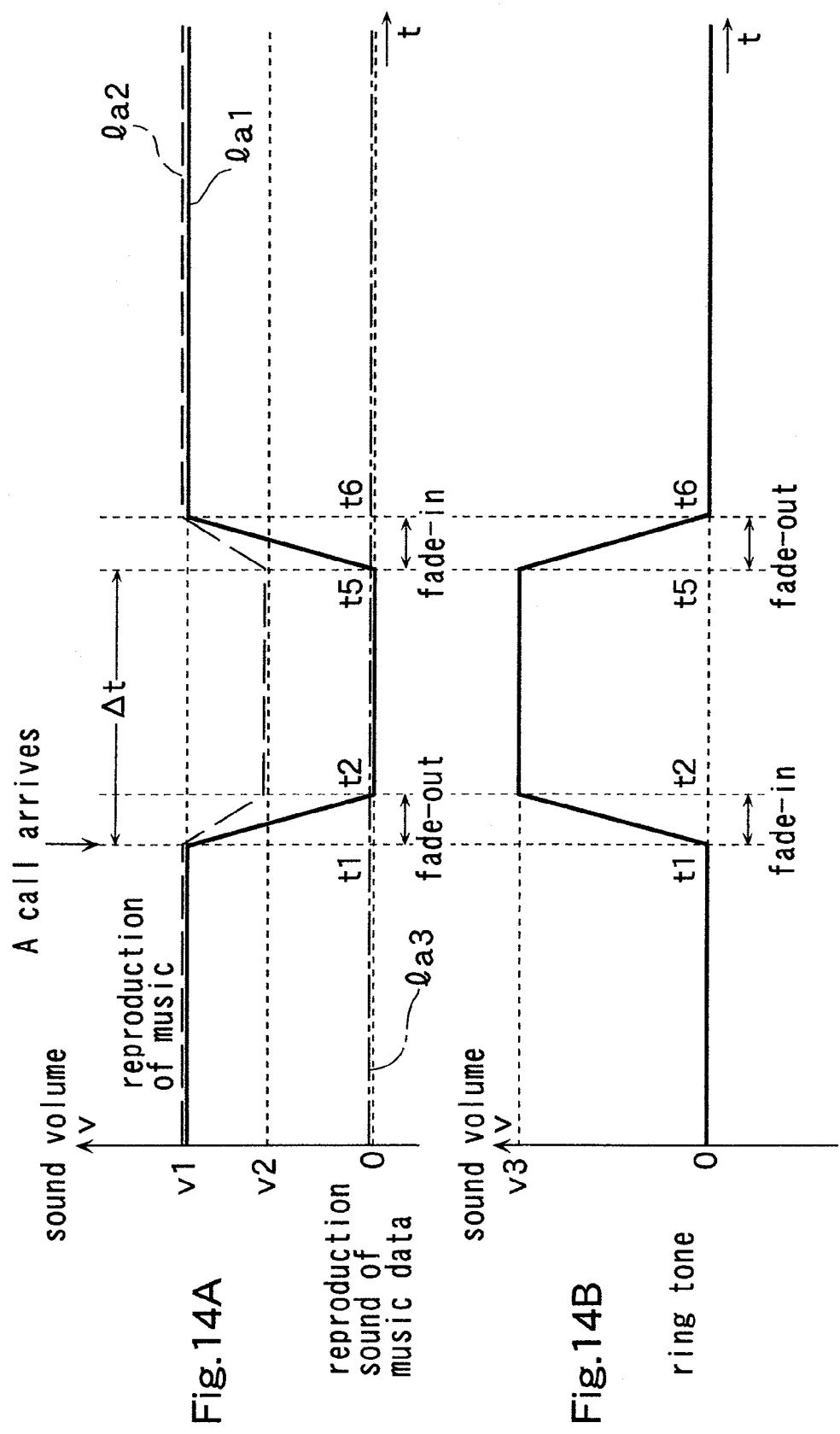

MOBILE PHONE WITH MUSIC REPRODUCTION FUNCTION, MUSIC DATA REPRODUCTION METHOD BY MOBILE PHONE WITH MUSIC REPRODUCTION FUNCTION, AND THE PROGRAM THEREOF

This application is a Divisional of U.S. application Ser. No. 11/166,166, filed Jun. 27, 2005 now U.S. Pat. No. 7,869,580, which is a Divisional of U.S. application Ser. No. 09/973,798, filed Oct. 11, 2001, now U.S. Pat. No. 6,947,728.

TECHNICAL FIELD

The present invention relates to a mobile phone with music reproduction function, and especially relates to a mobile phone which is characterized by the operations at the time of receiving a call when a call arrives during reproducing music data, during a talk, and after finishing a talk.

BACKGROUND ART

A memory has been remarkably miniaturized and had larger capacity in recent years. In addition, as the audio compression technologies have been improved, new compression methods such as MP3 (MPEG1 Audio Layer 3) have been suggested, wherein the quality of original sound in LPCM (Linear Pulse Code Modulation) is not so deteriorated as to be unfitted for comfortable listening even if it is compressed into one tenth of the original one. As these technologies have developed, it has been possible, for example, to record music data for one album on a stamp-sized semiconductor memory.

On the other hand, from the viewpoint of music distribution, in addition to the conventional distribution via package media such as cassette tapes and CDs, there are indications that the form of directly downloading music data via Internet or the like (hereinafter referred to as "electronic music distribution") has been widely used.

In the electronic music distribution, as mentioned above, the form of downloading music data via Internet using a personal computer (PC) is popular. However, since a PC costs lots of initial investment, other distribution channels than PC-Internet have been considered, and among them, the form of downloading music data by using a mobile phone has attracted much attention. Although a mobile phone has now problems of slow communication speed and high communication costs, it is expected that it can be one of the leading distribution channels if these problems are overcome by future improvement of communication technology. This is because mobile phones are very widely used and they need not so much cost of equipments required for electronic music distribution as PCs and others.

FIG. 1 is a diagram showing one example of a system of downloading/reproducing music data by using electronic music distribution. This music data downloading/reproducing system is comprised of a mobile phone 1101, a music reproduction player 1102 and a recording medium 1103. The mobile phone 1101, having a recording medium slot for inserting the after-mentioned recording medium 1103 in the body thereof, records the music data downloaded via Internet onto the recording medium 1103. The music reproduction player 1102, having a recording medium slot for inserting the recording medium 1103 therein, reads out and reproduces the music data recorded in the recording medium 1103. The recording medium 1103 is a portable memory such as a semiconductor memory, and stores the music data recorded by the mobile phone 1101.

As shown in FIG. 1, if it is considered that the music data is downloaded by a mobile phone for listening to music, it may happen that after recording the downloaded music data onto the portable recording medium 1103, the recording medium 1103 is removed from the mobile phone 1101 and then inserted again into the music reproduction player 1102 for reproduction thereof. However, since carrying about both a mobile phone and a music reproduction device on the way to office and/or school means occupying the space such as a bag with them, a mobile phone with music reproduction function, that is an integrated composite device having functions of both a mobile phone and a music reproduction device (hereinafter referred as a mobile phone with music reproduction function) is desired.

As this kind of mobile phone with music reproduction function is just based on a phone, the processing which is not required for an ordinary music reproduction device is needed if a call arrives during reproducing music. For example, assuming that a call is received during listening to music by using a mobile phone with music reproduction function, it will be found that a mobile phone with music reproduction function has the following problems or challenges:

(1) Processing on Receiving a Call

An ordinary mobile phone informs a user of an incoming call by sound (a ring tone) outputted mainly from a speaker of the main body. However, a mobile phone with music reproduction function must notify a user of a ring tone without fault even while the user is listening to music through headphones. Particularly if a melody tone is set to announce incoming calls, the music which the user is listening to must be clearly distinguished from the melody tone for incoming calls. In order to solve these problems, Japanese Laid-Open Patent Application H09-321844 discloses a portable communication device for outputting a ring tone by switching from music reproduction sound outputted from headphones, or outputting both a music reproduction sound and a ring tone by overlapping them, so as to notify a user of a ring tone when he/she receives a call during reproducing music.

This device is, however, uncomfortable and troublesome for a user, because reproducing music is suddenly switched into a ring tone on an unexpected timing, or abruptly overlapped with a ring tone.

Also, it is desirable if the following processing is realized in addition to the above-mentioned processing on receiving a call.

(2) Processing During a Talk

Although it is generally desirable to stop reproducing music data during a talk, it is considered that music reproduction need not always be stopped if a communicating partner over a phone is a close person like a family member.

(3) Reproduction Resume

When a music reproduction player temporarily stops music reproduction, it generally executes an operation of resuming music reproduction at the position of stopping reproduction. Compared with this kind of player for music reproduction only, a user's request for a mobile phone with music reproduction function may be quite different in that music reproduction is interrupted by receiving a call regardless of the user's will, that is, it is forced to be interrupted.

DISCLOSURE OF THE INVENTION

It is accordingly an object of the present invention, in the light of the above-mentioned conventional problems, to provide a more user-friendly mobile phone with music reproduction function without making a user feel uncomfortable by offering not only processing to solve problems which may arise when a call arrives during reproduction of music, but also various methods of music reproduction during a talk and reproduction resume after finishing a talk.

More specifically, the present invention has the following three objects: The first object of the present invention is to provide a mobile phone with music reproduction function that can surely inform a user of receiving a call without interrupting music reproduction suddenly when a call arrives during reproduction of music.

Also, the second object of the present invention is to provide a mobile phone with music reproduction function for a comfortable use that can convert the reproducing music into BGM during a talk, or reproduce music which is preset for each communicating partner as BGM during a talk.

Further, the third object of the present invention is to provide a mobile phone with sophisticated music reproduction function that has as many resume functions as a dedicated music reproduction player or more, in which, in the case of stopping reproduction of music on receiving a call, music reproduction is resumed at the position run back for a predetermined time period from that of receiving a call, or from the beginning of the music.

In order to achieve the above-mentioned objects, the mobile phone according to the present invention is a mobile phone with a content reproduction function, the mobile phone including: a reproduction unit operable to reproduce a content; an incoming call detection unit operable to detect an incoming call from outside; a ring tone outputting unit operable to output a ring tone; a stop unit operable to instruct the reproduction unit to stop reproduction of the content after fading out the content, and to instruct the ring tone outputting unit to output a ring tone while fading in the ring tone, when the incoming call detection unit detects an incoming call while the reproduction unit is reproducing the content; a resume method storage unit operable to store information indicating at least two reproduction resume methods; and a control unit operable to select one of the at least two reproduction resume methods stored in the resume method storage unit, to specify a reproduction start position of the content based on the selected reproduction resume method, and to instruct the reproduction unit to reproduce the content from the specified reproduction start position, after reproduction is stopped by the reproduction unit in accordance with the instruction from the stop unit and a conversation finishes, wherein the at least two reproduction resume methods include at least one of a method to reproduce the content from a beginning of the content which was being reproduced just before being stopped, a method to reproduce the content from a point at which the reproduction of the content was stopped, and a method to jump back to the content for a specified time from a point at which the reproduction of the content was stopped and to restart the reproduction of the content at the point.

In the above-mentioned mobile phone, the resume method storage unit includes a resume position information storage unit operable to store per the content, resume position information indicating at least one break point of content, and one of the at least two reproduction resume methods is a method to reproduce the content from the at least one break point indicated by the resume position information just before a point at which the reproduction of the content was stopped.

The above-mentioned mobile phone further includes: a reproduction resume method memory unit operable to memorize a reproduction resume method designated by a user, wherein the control unit is operable to instruct the reproduction unit to reproduce the content based on the designated reproduction resume method.

The above-mentioned mobile phone further includes: a measurement unit operable to measure a call duration, wherein the control unit is operable to instruct the reproduction unit to reproduce the content from the beginning of the content which was being reproduced just before being stopped, when the call duration measured by the measurement unit exceeds a predetermined duration.

Another aspect of the present invention is a content reproduction method of a mobile phone with a content reproduction function for storing information indicating at least two reproduction resume methods in a memory in advance, the content reproduction method including: reproducing a content; detecting an incoming call from outside; outputting a ring tone; temporarily stopping reproduction of the reproduced content after fading out the content, and outputting a ring tone while fading in the ring tone, when an incoming call is detected while the content is being reproduced; and selecting one of the at least two reproduction resume methods stored in the memory, specifying a reproduction start position of the content based on the selected reproduction resume method, and resuming reproduction of the content from the specified reproduction start position, after reproduction is stopped and a conversation finishes, wherein the at least two reproduction resume methods include at least one of a method to reproduce the content from a beginning of the content which was being reproduced just before being stopped, a method to reproduce the content from a point at which the reproduction of the content was stopped, and a method to jump back to the content for a specified time from a point at which the reproduction of the content was stopped and to restart the reproduction of the content at the point.

Still another aspect of the present invention is a program embodied on a computer readable medium for execution by a computer of a mobile phone with a content reproduction function for storing information indicating at least two reproduction resume methods in a memory in advance, the program including: computer readable program code operable to reproduce a content; computer readable program code operable to detect an incoming call from outside; computer readable program code operable to output a ring tone; computer readable program code operable to instruct the computer readable program code operable to reproduce a content to stop reproduction of the content after fading out the content, and to instruct the computer readable program code operable to output a ring tone to output a ring tone while fading in the ring tone, when the computer readable program code operable to detect an incoming call detects an incoming call while the computer readable program code operable to reproduce a content is reproducing the content; and computer readable program code operable to select one of the at least two reproduction resume methods stored in the memory, to specify a reproduction start position of the content based on the selected reproduction resume method, and to resume reproduction of the content from the specified reproduction start position, after reproduction is stopped and a conversation finishes, wherein the at least two reproduction resume methods include at least one of a method to reproduce the content from a beginning of the content which was being reproduced just before being stopped, a method to reproduce the content from a point at which the reproduction of the content was stopped, and a method to jump back to the content for a specified time from a point at which the reproduction of the content was stopped and to restart the reproduction of the content at the point.

Furthermore, the present invention can be embodied as a music data reproduction method including steps for implementing the characteristic units included in the mobile phone, or as a program including the steps. Also, the program can, of course, be distributed via a recording medium such as CD-ROM.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 6 is a diagram that shows one example of the information which is stored in the resume information storage area 303 as shown in FIG. 5.

FIG. 8 is a diagram that shows by specific figures the relations between the incoming call reproduction position information 312 which can be applicable for three types of resume patterns and the resume position information indicating an address of the reproduction resume position.

FIG. 13A is a timing chart that shows the sound volume transition of the music data reproduction sound of the mobile phone 100 with music reproduction function if a user responds to a call within a time specified.

FIG. 13B is a timing chart that shows the sound volume transition of the ring tone of the mobile phone 100 with music reproduction function if a user responds to a call within a time specified.

FIG. 14A is a timing chart that shows the sound volume transition of the music data reproduction sound of the mobile phone 100 with music reproduction function if a user does not respond to a call within a time specified Δt.

FIG. 14B is a timing chart that shows the volume transition of the ring tone of the mobile phone 100 with music reproduction function if a user does not respond to a call within a time specified Δt.

BEST MODE FOR CARRYING OUT THE INVENTION

The following is a detailed explanation of the structure of the mobile phone with music reproduction function according to one embodiment of the present invention with reference to figures. In the present embodiment, the explanation will be given on the assumption that the data subject to reproduction is limited to music data. Note that, however, the present invention is not limited to this embodiment, and may be embodied in combination of image data and music data, text data and music data, image and text data and music data, and others.

Figure 1:
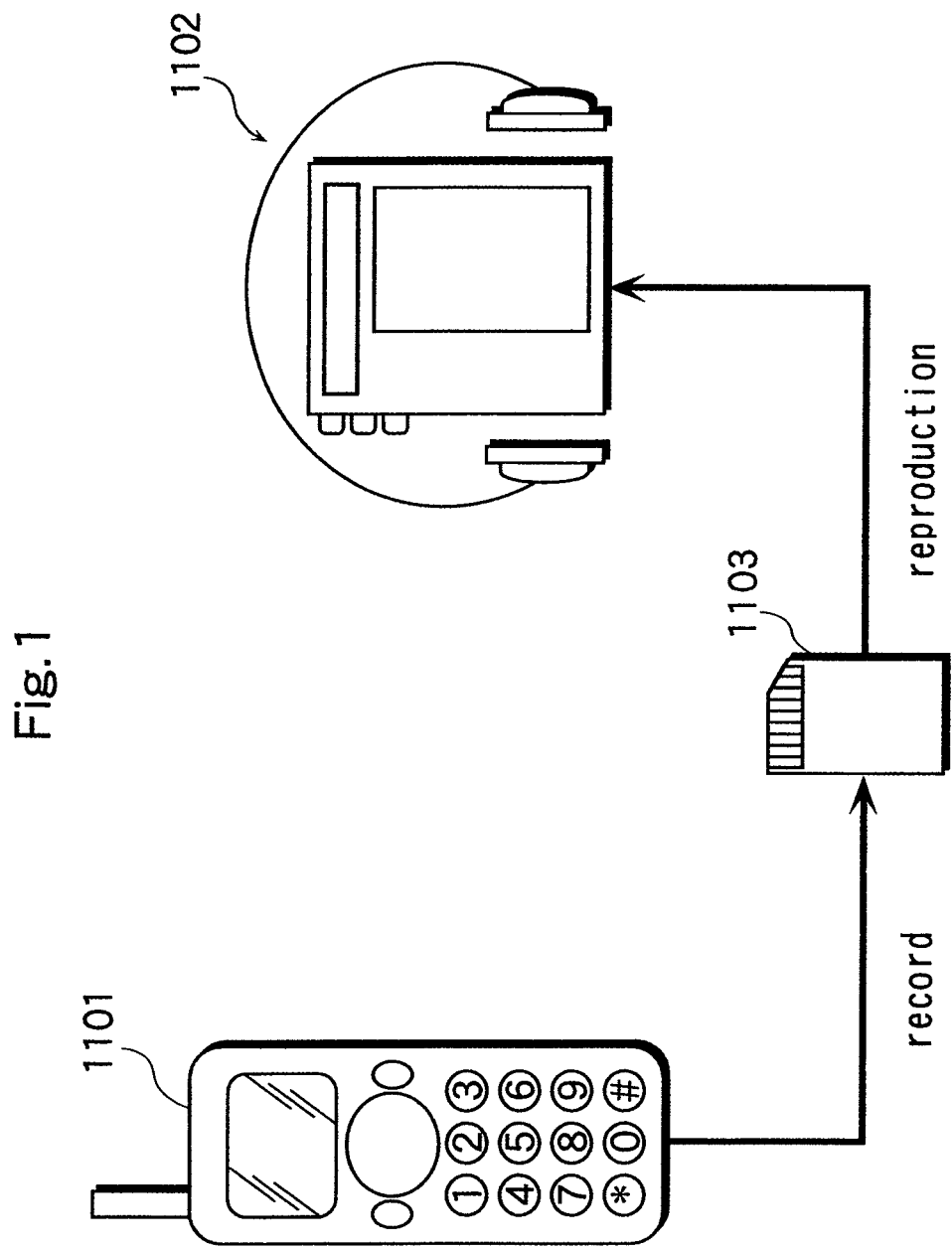
FIG. 1 is a diagram that shows one example of a music data downloading/reproducing system by using electronic music distribution.
Figure 2:
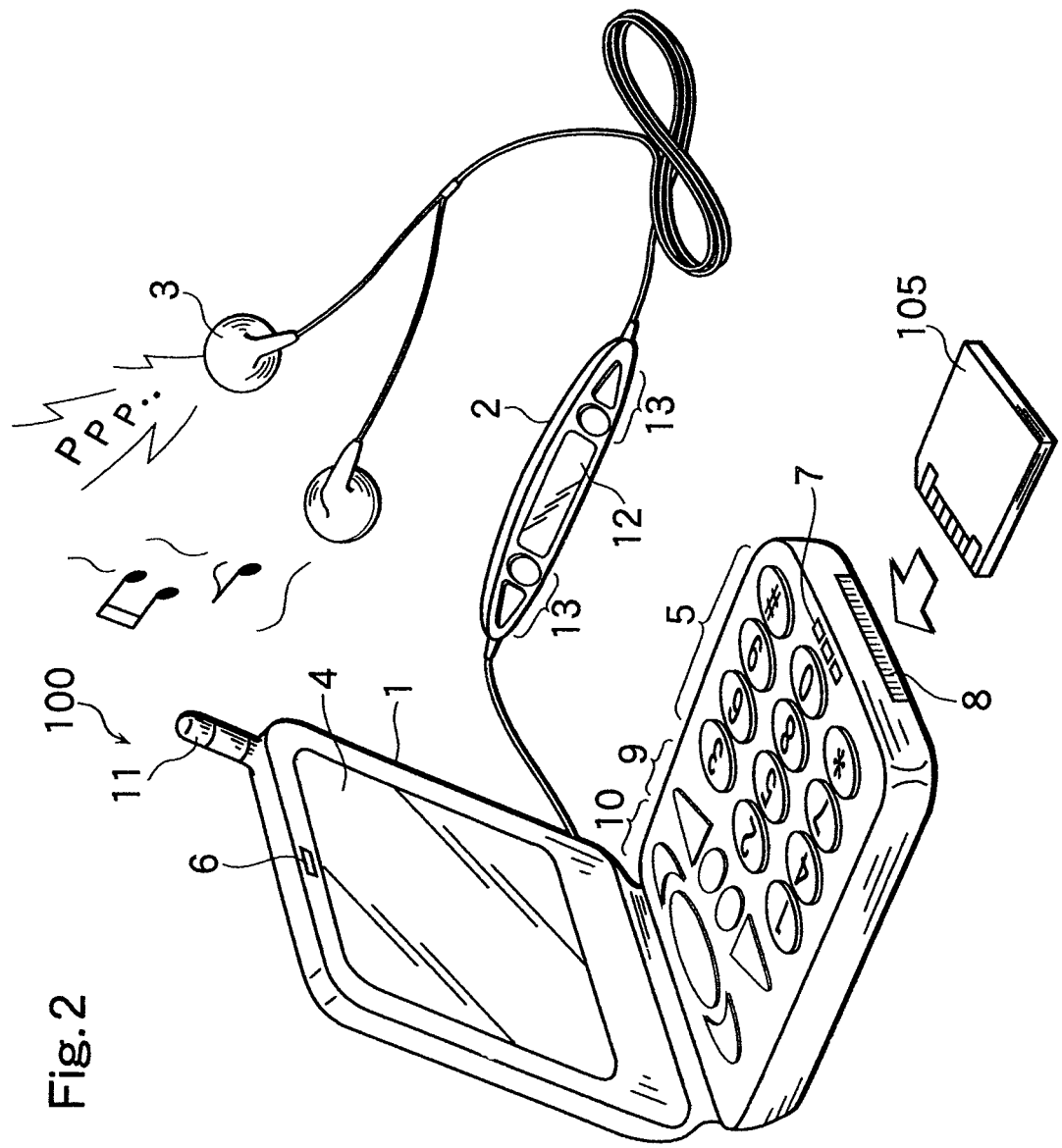
FIG. 2 is a diagram that shows appearance of the mobile phone 100 with music reproduction function of the present invention.

FIG. 2 is a diagram that shows the appearance of the mobile phone 100 with music reproduction function of the present invention. The mobile phone 100 with music reproduction function of the present invention is typically a composite machine of a mobile phone and audio reproduction player, and can be used as a personal headset stereo as well as a phone. The mobile phone 100 with music reproduction function is mainly comprised of a main body 1, controller 2, headphones 3, and a music data recording medium 105. The main body 1 is equipped with a liquid crystal display panel 4, a ten key unit 5, a speaker 6, a microphone 7, a recording medium slot 8, a music reproduction control key unit 9, a phone control key unit 10, an antenna 11 and others. The controller 2 is equipped with a liquid crystal display panel 12 and a music reproduction control key unit 13 and others. The headphones 3 are speakers which output music data reproduction sound, a ring tone, partner's voice and others through the ear pad unit thereof which a user wears over his/her ears.

The liquid crystal display panel 4 displays the contents regarding a mobile phone such as a phone number which a user inputs by operating the after-mentioned ten key unit 5, a caller's phone number on receiving a call, phone book data which a user registers, setting of each function, a note, a text of e-mail, and a Web page, as well as the contents regarding a music reproduction player such as a title of reproducing music data, music data reproducing order and a music data reproducing mode.

The ten key unit 5 is a unit for inputting keys indicating figures, characters, symbols and cursor movement by which a user inputs a phone number and a text of an e-mail or sets a reproduction mode of music data. The speaker 6 outputs reproduction sound of music data, a ring tone, a communicating partner's voice and others. The microphone 7 inputs a user's voice.

The recording medium slot 8 is an inserting slot for connecting the music data recording medium 105 to the main body 1. The music reproduction control key unit 9 is a key input unit which is equipped with a sound volume button and buttons for various functions of a music reproduction player such as music data reproduction start, rewind, fast-forward, reproduction stop, and mode settings. The phone control key unit 10 is a key input unit which is equipped with buttons for various functions of a mobile phone such as calling, talking, holding, cutting the line, connecting with Internet, and cutting off the power. The antenna 11 transmits and receives a radio wave of mobile phone communication.

The liquid crystal display panel 12 mainly displays the abbreviated contents regarding music data reproduction. The music reproduction control key unit 13 is equipped with a sound volume button and buttons for various functions of a music reproduction player such as music data reproduction start, rewind, fast-forward, reproduction stop and mode settings.

Figure 3:
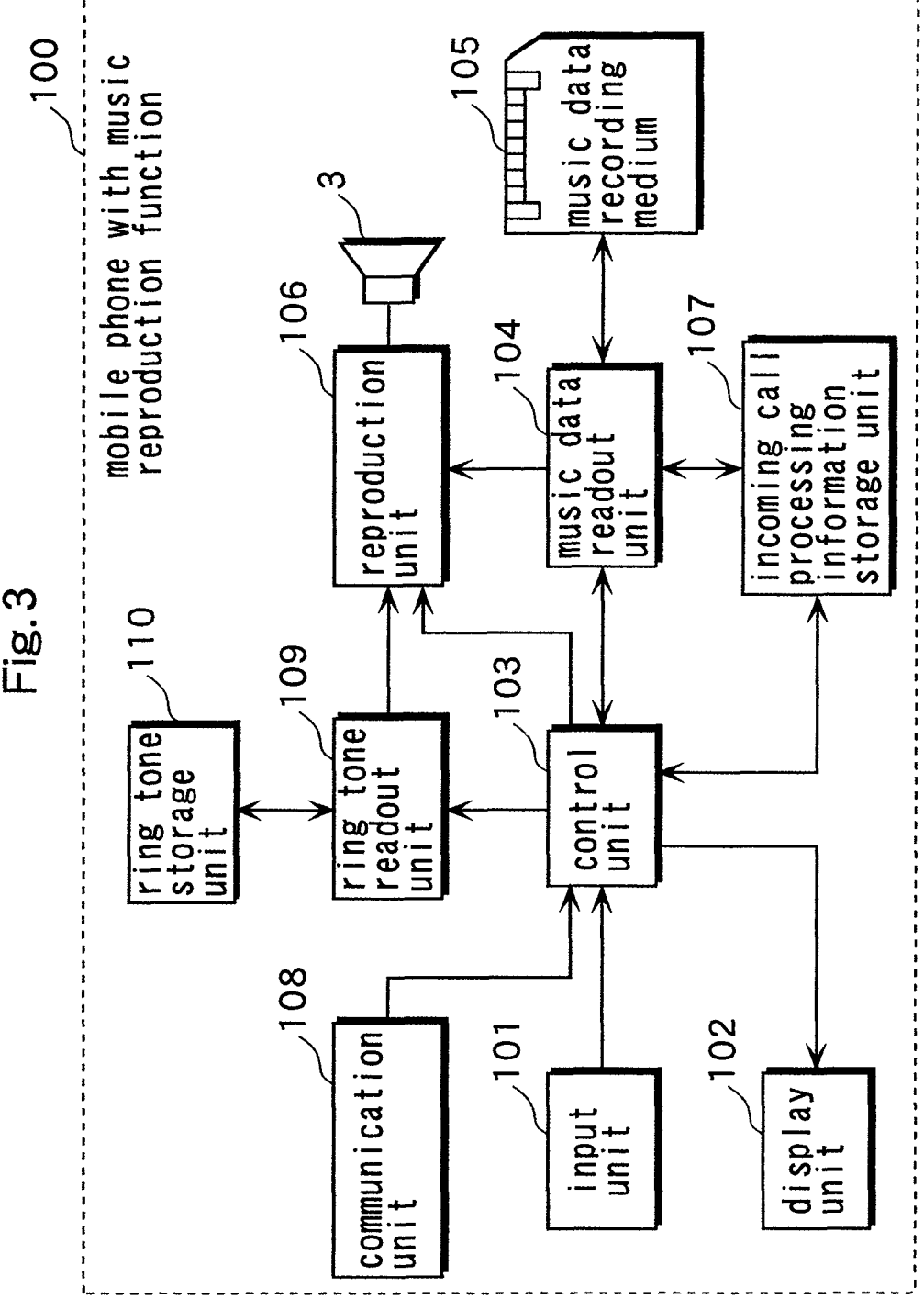
FIG. 3 is a functional block diagram that shows the structure of the mobile phone 100 with music reproduction function as shown in FIG. 2.

FIG. 3 is a functional block diagram that shows the structure of the mobile phone 100 with music reproduction function as shown in FIG. 2. The mobile phone 100 with music reproduction function of the present invention is, as shown in FIG. 3, equipped with an input unit 101, a display unit 102, a control unit 103, a music data readout unit 104, a music data recording medium 105, a reproduction unit 106, an incoming call processing information storage unit 107, a communication unit 108, a ring tone readout unit 109 and a ring tone storage unit 110. These component elements will be explained below.

The input unit 101, which is equivalent to an operation unit such as the ten key unit 5, the music reproduction control key unit 9, the phone control key unit 10 and the music reproduction control key unit 13, and a voice sound input unit such as the microphone 7, accepts the input of a user's instructions by his/her operating the above-mentioned operation unit. User's instructions include, for example, an instruction to accept the input of the communicating partner's phone number to make a call, a reproduction start instruction to start music reproduction, a stop instruction to stop music reproduction, a fast-forward instruction to fast-forward music reproduction and a rewind instruction to rewind music reproduction.

The display unit 102, which is the liquid crystal display panel 4 and the liquid crystal display panel 12 as shown in FIG. 2, displays a phone number of which input was accepted by the input unit 101 and a title of the reproducing music.

The control unit 103, which is typically equipped with a CPU, a ROM/RAM and others, controls each unit of the mobile phone 100 with music reproduction function by executing the programs stored in the ROM. This means, for example, the control unit 103 interprets a user's instruction of inputting a phone number via the input unit 101, instructs the communication unit 108 to make a call, and instructs the display unit 102 to display the phone number inputted by a user. Also, if a user instructs to reproduce music via the input unit 101, it instructs to read out music data to the after-mentioned music data readout unit 104.

Further, when a call arrives, the control unit 103 executes a specified incoming call processing depending on the incoming call processing methods stored in the after-mentioned incoming call processing information storage unit 107. For example, if music is being reproduced when a call arrives, it instructs the after-mentioned ring tone readout unit 109 to read out the ring tone stored in the after-mentioned ring tone storage unit 110, instructs the after-mentioned reproduction unit 106 to start fading out the reproducing music and fading in the ring tone, and instructs the after-mentioned music data readout unit 104 to stop reading out the music data after finishing fade-out.

In addition, if music data has been reproduced and reproduction thereof is stopped at the time of receiving a call, the control unit 103 instructs the music data readout unit 104 to read out the music data from a specified reproduction starting position based on the resume method stored in the incoming call processing information storage unit 107 when a talk finishes.

The music data readout unit 104 records the music data, image data, text data or the like downloaded by the after-mentioned communication unit 108 in the after-mentioned music data recording medium 105, as well as reads out the music data and others recorded in the music data recording medium 105 based on the instruction by the control unit 103 to read out music data.

The music data recording medium 105 is typically a small-sized portable read/write recording medium comprised of a semiconductor memory and others, and the music data downloaded from Internet and others via the after-mentioned communication unit 108 is, for example, recorded therein.

The music data recording medium 105 has a sector structure. Each sector stores digital data of 512 byte according to the present embodiment. The music data recording medium 105 stores file system information for managing multiple sectors as a file in the predetermined sectors. The file system applied for the music data recording medium 105 is based on the file system prescribed under ISO9293. Note that the music data recording medium 105 need not always be removable from the mobile phone 100 with music reproduction function of the present invention, and may be built in the mobile phone 100 with music reproduction function.

The reproduction unit 106, which is equipped with an MPEG decoder, a D/A converter, a sound volume controlling circuit and a speaker, reproduces music data, a ring tone and communicating voice/sound. It decodes, makes D/A conversion of, and reproduces the music data which the music data readout unit 104 reads out from the music data recording medium 105. The decoded music can be listened to over headphones or the like. Also, the reproduction unit 106 has a sound volume controlling function such as fade-in and fade-out.

The incoming call processing information storage unit 107 is typically an EEPROM (Electrically Erasable Programmable Read-Only Memory), and a memory that stores a communicating partner's phone number, ring tone reproduction methods when a call arrives, and information of resume of music data reproduction after finishing a talk. More specifically as to resume of music data reproduction, the incoming call processing information storage unit 107 is a memory in which the file name and position information of the music data which the reproduction unit 106 was reproducing, and the resume method (or the information for identifying the resume method) indicating at which position of the music data reproduction is to be resumed are stored when the control unit 103 instructs the reproduction unit 106 to stop music data reproduction. The control unit 103 refers to this information when it resumes music data reproduction, identifies appropriate music data and a specific readout position thereof, and instructs the music data readout unit 104 to readout the music data.

Also, the incoming call processing information storage unit 107 stores the phone book registered by the user of the mobile phone 100 with music reproduction function. It also stores the contents set by the user of the processing method on receiving a call per communicating partner which the user designates corresponding to the phone book.

The communication unit 108 includes an antenna, a wireless transmission/reception unit and a communication interface which communicate with base stations by wireless. Also, the communication unit 108 informs the control unit 103 of start/finish of communication-related processes such as receiving a call, and start and finish of a talk.

The ring tone readout unit 109 reads out a ring tone from the after-mentioned ring tone storage unit 110, in response to the instruction from the control unit 103 of reading out a ring tone.

The ring tone storage unit 110 is a recording medium in which ring tones are stored. The ring tones which can be recorded therein are not limited to one, in other words, more than one ring tone may be recorded. In this case, the ring tone which is to be read out may be preset, or selected at random.

Figure 4:
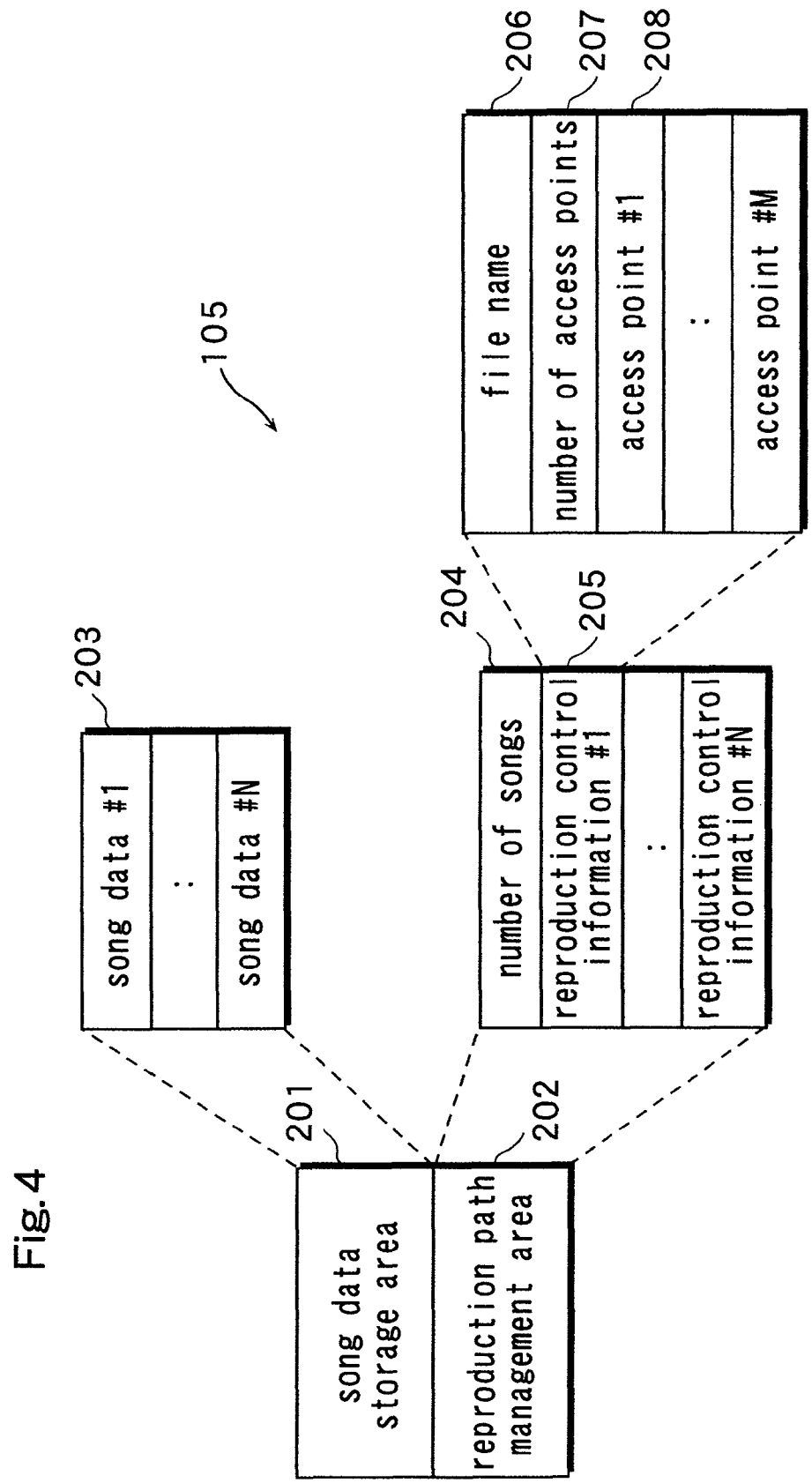
FIG. 4 is a diagram that shows one example of the data structure of digital music data which is recorded in the music data recording medium 105 as shown in FIG. 3.

FIG. 4 is a diagram that shows one example of the data structure of digital music data which is recorded in the music data recording medium 105 as shown in FIG. 3. As shown in FIG. 4, the music data recording medium 105 is comprised of a song data storage area 201 in which the music data is stored per song in a file format, and a reproduction path management area 202 in which reproduction path information that defines the reproduction order of the music data is stored.

The song data storage area 201 is an area in which, song data 203 recorded in an MPEG2-AAC (Advanced Audio Coding) format, for example, is stored per song in a file format. Note that $0 \leq N \leq 999$ song data, that is, a maximum of 999 song data can be stored in the song data storage area 201.

On the other hand, the reproduction path management area 202 is an area in which the reproduction path information, that is, the information that defines reproduction order of the song data 203 recorded in the song data storage area 201 is stored. Reproduction path information is comprised of a number of melodies 204 indicating the number of the song data 203 recorded in the song data storage area 201, and reproduction control information 205 of each song data 203 recorded in the song data storage area 201.

The number of melodies 204 is the information indicating the number N of the song data 203 stored in the song data storage area 201, that is, the number of music data recorded in the music data recording medium 105, and $0 \leq N \leq 999$, that is, a maximum of 999 melodies can be recorded according to the present embodiment, as described above in the explanation of the song data 203.

The reproduction control information 205 is comprised of a file name 206 indicating the file name of the song data 203, a number of access points 207 indicating the number M of the access points which can be selected for a reproduction resume position of the song data 203 when music reproduction is resumed as described later, and access points 208 indicating the address position of each access point. Note that the number of access points 207 is $0 \leq M \leq 99$, that is, 99 at maximum.

By the way, the music data recording medium 105 is equipped with a so-called FAT (File Allocation Table) file system prescribed under ISO9293 as described before, and can identify the said file based on the file name described in the file name 206 so as to specify the recording start address and recording end address of the song data 203 based on the information of the FAT table.

Further, in reproducing music, the song data 203 is reproduced in the order described in the reproduction control information 205. For example, if the song data #1 is described in the reproduction control information #1, the song data #3 in the reproduction control information #2, and the song data #2 in the reproduction control information #3, respectively, the song data is reproduced in the order of data #1, #3 and #2.

As mentioned above, according to the data structure of the music data recording medium 105 as shown in FIG. 4, music data itself can be stored in the music data recording medium 105, and, at the same time, the reproduction order thereof can be defined by the reproduction path information stored in the reproduction path management area 202.

Figure 5:
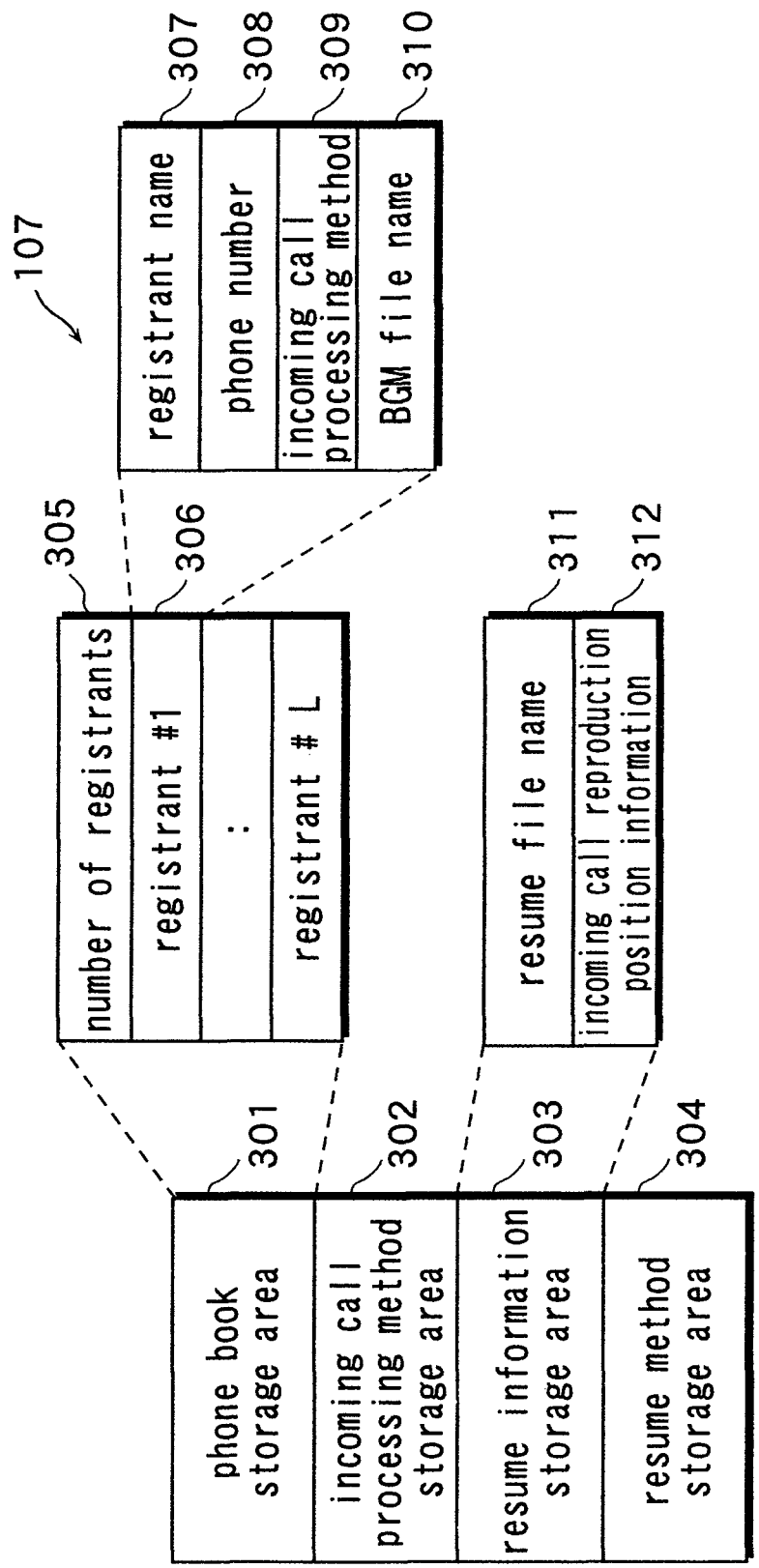
FIG. 5 is a diagram that shows the data structure of the information which is stored in the incoming call processing information storage unit 107 as shown in FIG. 3.

FIG. 5 is a diagram that shows the data structure of the information which is stored in the incoming call processing information storage unit 107 as shown in FIG. 3. As shown in FIG. 5, the incoming call processing information storage unit 107 is comprised of a phone book storage area 301, an incoming call processing method storage area 302, a resume information storage area 303 and resume method storage area 304.

The phone book storage area 301 is an area in which a user of the mobile phone 100 with music reproduction function of the present invention registers the communicating partners' phone numbers and names by operating the input unit 101. The phone book storage area 301 is comprised of a number of registrants 305 indicating the number L of the registered communicating partners, and a registrant 306 indicating the information of registered communicating partners.

The number of registrants 305 is the information indicating how many registrants' data are registered in the phone book storage area 301, and $0 \leq L \leq 99$, that is, a maximum of 99 registrants can be registered.

The registrant 306 is further comprised of a registrant name 307, a phone number 308, an incoming call processing method 309 and a BGM file name 310.

The registrant name 307 describes the names which the user of the mobile phone 100 with music reproduction function inputs when he/she registers the communicating partners in the phone book storage area 301. The phone number 308 describes the phone numbers of the communicating partners whose names are written in the registrant name 307. The incoming call processing method 309 is the information indicating the processing method on receiving a call per registrant (communicating partner over a phone) whose name is written in the registrant name 307, and if music reproduction is stopped on receiving a call and a ring tone is reproduced, for example, "1" is written. If music is reproduced as BGM during a talk without stopping reproduction thereof on receiving a call, "2" is written. The BGM file name 310 stores the file name of the music data that is to be reproduced as BGM during a talk if a call arrives from the registrant whose name is written in the registrant name 307 while music data is not being reproduced. If a file name of the music data that is to be reproduced as BGM is not specified, "0" is written.

Note that, according to the present embodiment, when the incoming call processing method 309 is "2" and a call arrives during reproducing music data, the reproducing music data is continued to be reproduced as BGM without stopping it. Also, when the incoming call processing method 309 is "2" and a call arrives while music data is not being reproduced, the music data having the file name written in the BGM file name 310 is reproduced as BGM. The present invention is not, of course, limited to this embodiment, but if a call arrives during reproducing music data and when the incoming call processing method 309 is "2", for example, reproduction of music data can be stopped once so as to reproduce the music data having the file name written in the BGM file name 310.

Next, the incoming call processing method storage area 302 is an area in which a processing method on receiving a call for a caller who is not registered in the phone book storage area 301 is stored. The processing method on receiving a call is as follows: If reproduction of music data is stopped and a ring tone is reproduced when a call arrives during reproducing music data, "1" is written. If reproduction of music data is not stopped when a call arrives and music data is reproduced as BGM during a talk, "2" is written.

Note that an area for storing a file name of music data for BGM such as the BGM file name 310 is not set up in the incoming call processing method storage area 302. Therefore, when a call arrives while music data is not being reproduced even if "2" is stored in the incoming call processing method storage area 302, music data is not reproduced as BGM for a caller who is not registered in the phone book storage area 301. The present invention is not limited to this embodiment, of course, but music data can also be reproduced as BGM during a talk for a caller who is not registered in the phone book storage area 301, by setting up in the incoming call processing method storage area 302 an area for storing the file name of music data which is to be reproduced as BGM during a talk for a caller who is not registered in the phone book storage area 301 so as to describe the file name of music data which is to be reproduced as BGM during a talk as it is written in the BGM file name 310.

The resume information storage area 303 is comprised of the resume file name 311 and the incoming call reproduction position information 312.

The resume file name 311 describes the file name of music data which is being reproduced when the control unit 103 instructs to stop reproduction thereof, if a user of the mobile phone 100 with music reproduction function is reproducing music data when a call arrives. On the other hand, if music data is being reproduced when a call arrives, the incoming call reproduction position information 312 describes address information indicating the reproduction position of music data at the point of time when the control unit 103 instructs the reproduction unit 106 to stop reproduction thereof.

FIG. 6 is a diagram that shows one example of the information which is stored in the resume information storage area 303 as shown in FIG. 5. The resume information storage area 303 stores a resume file name 401 and incoming call reproduction position information 402. In the resume file name 401, the file name "Song01.aac" of the music data is written which is being reproduced when a call arrives, that is, when the control unit 103 instructs the reproduction unit 106 to stop reproducing the music data. On the other hand, in the incoming call reproduction position information 402, the reproduction position of the file, which is being reproduced when a call arrives, that is, when the control unit 103 instructs the reproduction unit 106 to stop reproducing the music data, is written as byte number from the beginning of the file, "1234", for example. It is possible to specify the file of the music data which is being reproduced when a call arrives and the reproduction position thereof according to the information.

The resume method storage area 304 is an area in which the number corresponding to the resume patterns indicating a plurality of types of resume methods is stored. Music data reproduction is resumed according to the said resume methods if a user of the mobile phone 100 with music reproduction function is reproducing music data when a call arrives and stops reproducing music data during a talk. There are three types of resume patterns; resume pattern ① of resuming reproduction at the position of stopping thereof after finishing a talk, resume pattern ② of resuming reproduction at the position rewound for a specified time of seconds from the position of stopping reproduction, and resume pattern ③ of resuming reproduction from the beginning of the music, and they are stored in the resume method storage area 304 as numbers "1", "2" and "3", respectively.

Note that, although, in the case of resume pattern ② of resuming reproduction at the position which is rewound for a specified time of seconds, a fixed value of rewinding time, for example, 5 seconds or 3 seconds is stored in a ROM, the mobile phone 100 with music reproduction function of the present invention is not limited to this embodiment. An area for storing rewinding time of seconds from the position of stopping reproduction can be set up further in the resume method storage area 304, for example, so as to store the time inputted by a user therein. Further, in the case of resume pattern ②, if a call time during stopping reproducing music data is counted and is beyond a specified threshold, the resume pattern ③ may be uniformly applied even if "2" is stored in the resume method storage area 304, so as to resume reproducing music data from the beginning a melody of the music data.

Figure 7:
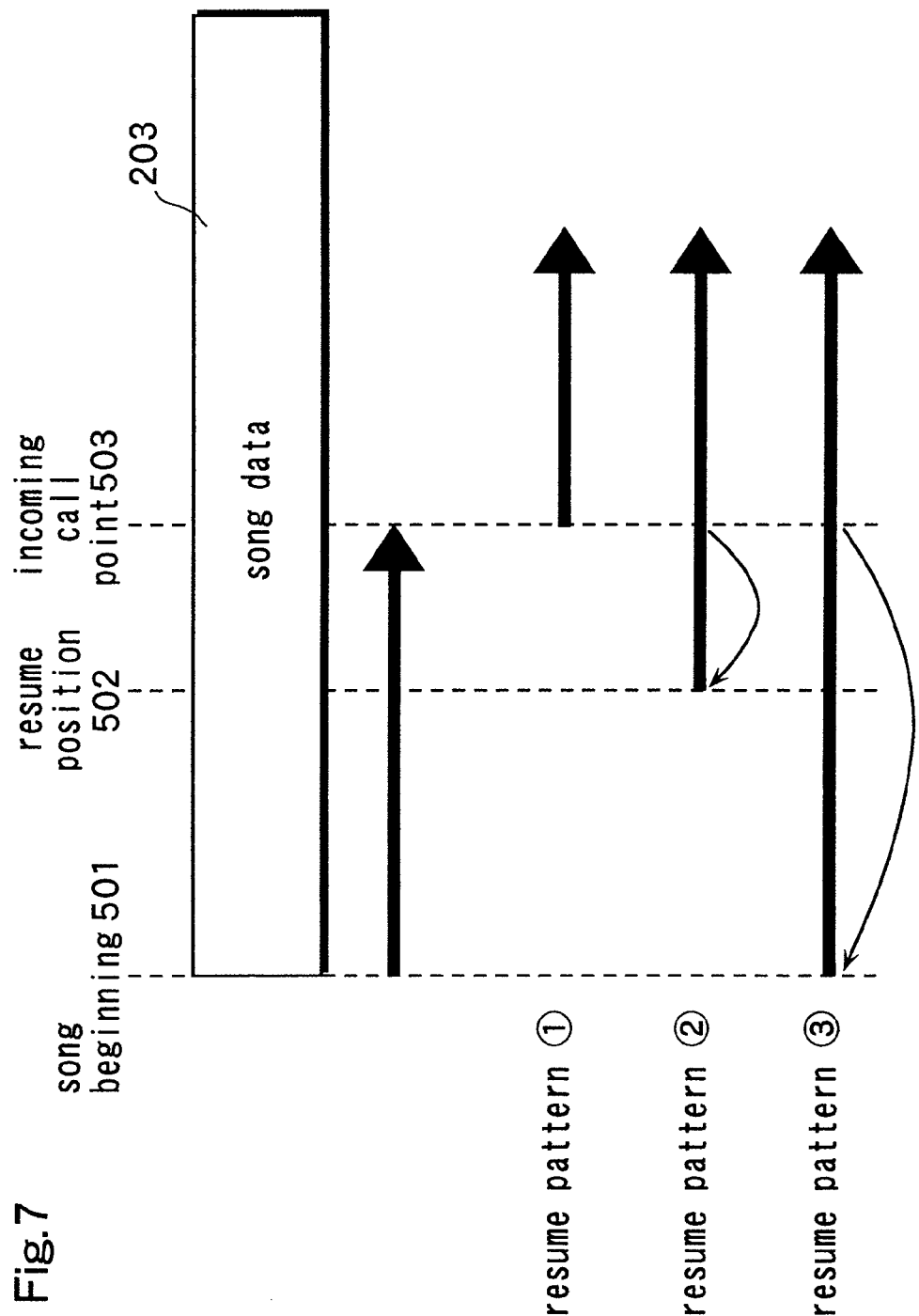
FIG. 7 is a diagram that shows three examples of the resume methods among those which the mobile phone 100 with music reproduction function performs.

FIG. 7 is a diagram that shows three examples of the resume methods among those which the mobile phone 100 with music reproduction function performs. In FIG. 7, assume that the song data 203 is being reproduced from a song beginning 501, the communication unit 108 detects receipt of a call at the position shown as a incoming call point 503, and the control unit 103 instructs the reproduction unit 106 to stop reproducing music data. In FIG. 7, according to the resume method as shown in the resume pattern ①, reproduction is resumed at an address stored in the incoming call reproduction position information 312 in the incoming call processing information storage unit 107. Next, according to the resume method as shown in the resume pattern ②, reproduction is resumed at a resume position 502 which is run back for a specified value from an address stored in the incoming call reproduction position information 312. Here, running back for a specified value means resuming reproduction at the point run back for 5 seconds, for example, from the point of reproduction on receiving a call. Note that, in order to run back for a specified value, it is necessary in reproduction to store addresses per second, for example, in a RAM from the beginning of the file and calculate an appropriate address at which reproduction is resumed based thereon.

Finally, according to the resume pattern ③, regardless of an address value stored in the incoming call reproduction position information 312 in the incoming call processing information storage unit 107, reproduction is resumed from the song beginning 501. FIG. 8 describes specific figures indicating the resume positions according to these three types of resume methods.

FIG. 8 is a diagram that shows by specific figures the relations between the incoming call reproduction position information 312 which can be applicable for three types of resume patterns and the resume position information indicating an address of the reproduction resume position. In FIG. 8, a resume pattern 601 shows three types of resume patterns as shown in FIG. 7. Incoming call reproduction position information 602 shows address information from the beginning of the file of the song data 203 which is being reproduced when a call arrives. Each information stored in resume position information 603 indicates at which position of the song data 203 the reproduction is resumed among 3 types of resume methods. Further, assume that the address which is stored in the incoming call reproduction position information 312 in the incoming call processing information storage unit 107 is "1234". In this case, according to the resume pattern ①, the address as resume position information is also "1234", since reproduction is resumed at the reproduction position at the point of receiving a call. Next, according to the resume pattern ②, the resume position is run back for a specified value from the reproduction position at the point of receiving a call, 5 seconds for reproduction, for example. "765" indicates the address value which is run back for the said specified value from "1234". Lastly, according to the resume pattern ③, the address as resume position information is "0" since reproduction is resumed from the song beginning 501.

As described above, according to the mobile phone 100 with music reproduction function of the present invention, three types of resume patterns ①~③ of the resume pattern 601 can be provided, thereby producing an effect that a user can choose and perform a resume method preferable for himself/herself among the above-mentioned methods ①~①.

Figure 9:
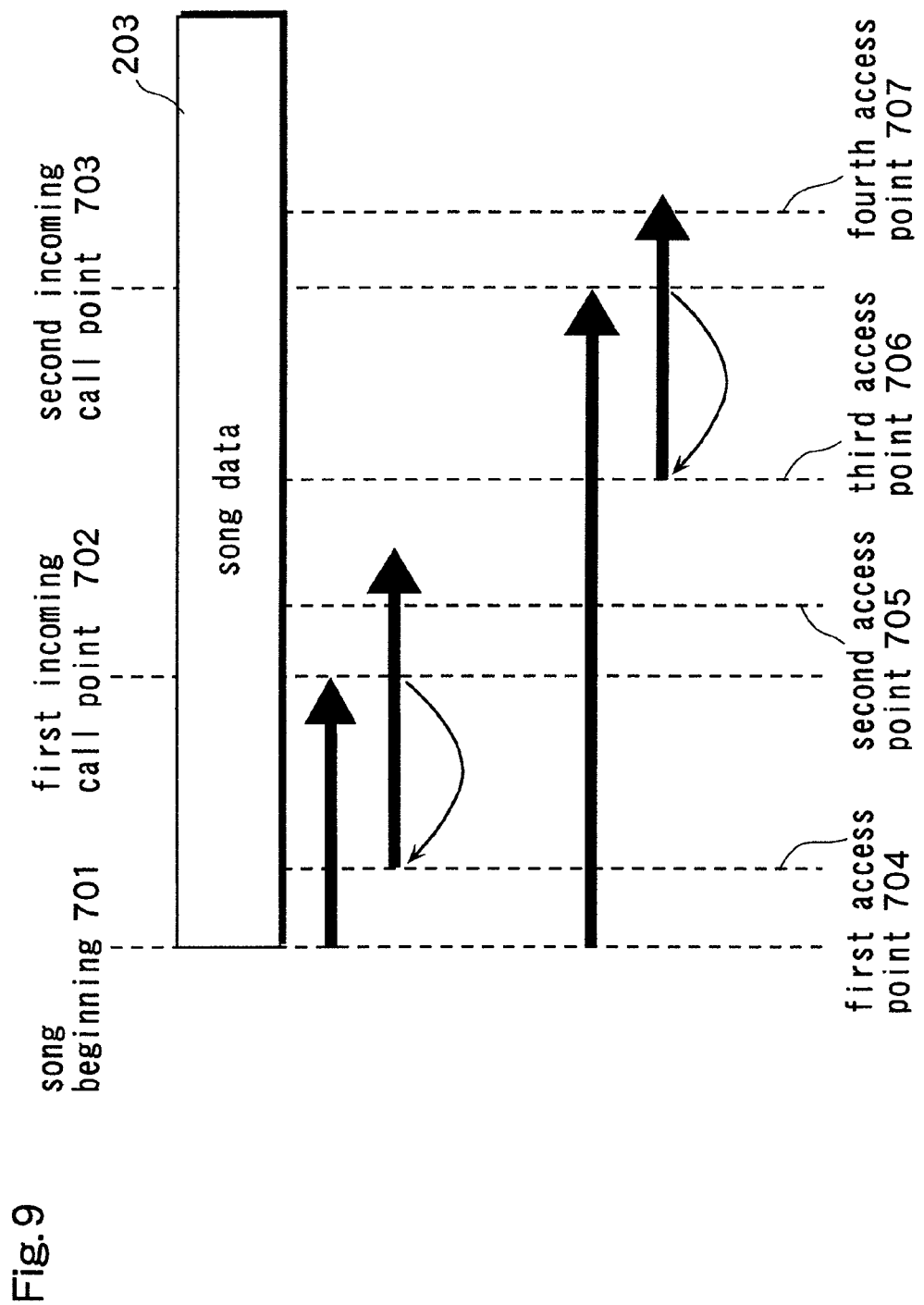
FIG. 9 is a diagram that shows one example of the method of specifying the resume position in relation to a variation example of the resume pattern ② by using the access point 208 in the music data recording medium 105 as shown in FIG. 3.

FIG. 9 is a diagram that shows one example of the method of specifying the resume position in relation to a variation example of the resume pattern ② by using the access point 208 in the music data recording medium 105 as shown in FIG. 3. For example, points which seem to be preferable for a user to resume reproduction such as the beginning of the first chorus, the beginning of the second chorus or each passage are stored beforehand in the access point 208. According to the present embodiment, 4 access points, first access point 704, second access point 705, third access point 706 and fourth access point 707 are registered therein. In FIG. 9, the top arrow indicates that the reproduction unit 106 reproduces the song data 203 from the song beginning 701, the communication unit 108 detects receipt of a call at the position shown as a first incoming call point 702, and the control unit 103 indicates the reproduction unit 106 to stop reproducing music data. The second arrow from the top indicates that the control unit 103 instructs the reproduction unit 106 to run back to the first access point 704 just before the first incoming call point 702 so as to resume reproduction thereat.

On the other hand, the third arrow from the top indicates that the reproduction unit 106 reproduces the song data 203 from the song beginning 701, the communication unit 108 detects receipt of a call at the position shown as a second incoming call point 703, and the control unit 103 instructs the reproduction unit 106 to stop reproducing the song data 203. Further, the fourth arrow from the top indicates that the control unit 103 runs back to the third access point 706 just before the second incoming call point 703 so as to resume reproduction thereat.

Note that, if there is no access point just before the incoming call point, the control unit 103 resumes reproduction from the song beginning 701. Further, a user can modify or add to the said access point 208 which is registered depending on the song data 203 by providing the mobile phone 100 with music reproduction function with an editing function.

As described before, according to the above-mentioned variation example, the access point 208 is determined which is possible to be chosen for the resume position depending on the contents of song data 203, and therefore, a user can decide more meaningful resume position than that decided based on the address information meaningless for a user who listens to music. Further, there is an effect that a variety of resume methods can be realized flexibly at a user's request by setting such a variety of resume patterns.

Next, the operations of the mobile phone 100 with music reproduction function as structured above are explained below by using flowcharts of FIG. 10~FIG. 12 and timing charts of FIG. 13A~FIG. 14B.

Figure 10:
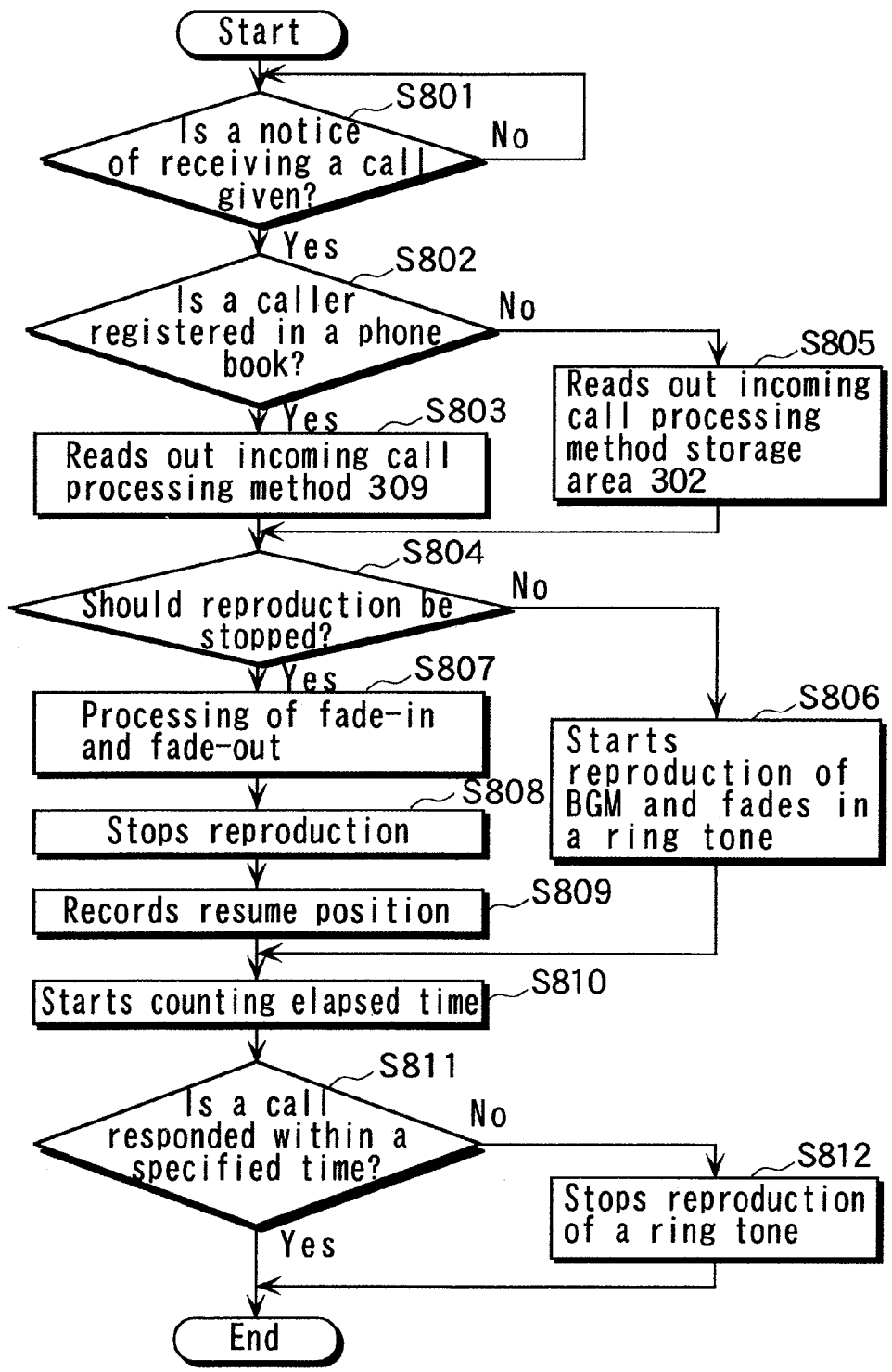
FIG. 10 is a flowchart that shows the operations of the control unit 103 when a call arrives during reproducing music data.

FIG. 10 is a flowchart that shows the operations of the control unit 103 when a call arrives during reproducing music data. The control unit 103 waits for a notice of receiving a call from the communication unit 108 during reproducing music data in the reproduction unit 106 (S801). If the control unit 103 receives a notice of receiving a call from the communication unit 108, it examines whether a caller's phone number is stored in the phone book storage area 301 of the incoming call processing information storage unit 107, and determines whether the caller has been already registered in the phone book storage area 301 (S802). If the caller has been already registered as a result of determination, the control unit 103 reads out the incoming call processing method stored in the incoming call processing method 309 (S803). On the other hand, if the caller has not registered in the phone book storage area 301 as a result of determination of Step S802, the control unit 103 reads out the incoming call processing method stored in the incoming call processing method storage area 302 (S805).

Then, the control unit 103 determines, based on the read-out incoming call processing method, whether to stop reproducing music data or continue reproducing music data as BGM (S804). If the control unit 103 determines to stop reproducing music data, it has the reproduction unit 106 start fade-out processing of music data reproduction, and at the same time, has the ring tone readout unit 109 read out a predetermined ring tone from the ring tone storage unit 110, and has the reproduction unit 106 start fade-in processing of the read-out ring tone so as to reproduce the ring tone by mixing it with the reproduction sound of music data (S807).

Further, the control unit 103 has the reproduction unit 106 stop reproducing music data (S808), records the file name 206 of reproducing music data in the resume file name 311 of the resume information storage area 303 within the incoming call processing information storage unit 107 and the address information of the point of stopping reproduction, that is, the resume position information in the incoming call reproduction position information 312 of the resume information storage area 303 (S809), and then, shifts to Step S810.

If the control unit 103 determines to continue reproducing music data as BGM in Step S804, it has the reproduction unit 106 tune down gradually the sound volume of the reproducing music data to that for BGM reproduction. At the same time, it has the ring tone readout unit 109 read out the predetermined ring tone from the ring tone storage unit 110, has the reproduction unit 106 start fade-in processing of the read-out ring tone, so as to reproduce the ring tone by mixing it with the BGM reproduction sound (S806), starts counting the time elapsed from the point when the ring tone starts reproducing, and waits for the notice of starting communication from the communication unit 108 (S810).

The control unit 103 counts the time elapsed from the point when the ring tone starts reproducing, determines whether the communication unit 108 gives notice of starting communication before the said counted elapsed time goes beyond a predetermined time, thereby determining whether or not a user responded to a call within a predetermined time (S811). If the user responded to a call within a predetermined time, the control unit 103 finishes the process. On the other hand, if the user did not respond to a call within a predetermined time, it has the reproduction unit 106 stop reproducing the ring tone assuming that the user has no will to respond to a call (S812), resumes reproduction of music data if the reproduction thereof is stopped, and returns the sound volume of music data to the ordinary volume (in a call waiting mode) if the music data is being reproduced as BGM, so as to complete the processing.

Note that in the present embodiment, the control unit 103 has the reproduction unit 106 perform the process of fading in a ring tone so as to reproduce it mixed with the reproduction sound of music data or BGM. It is not always necessary to mix the ring tone with the reproduction sound of music data, and the ring tone may be reproduced from the right (or left) side speaker of the headphones 3 and the reproduction sound of music data may be reproduced from the left (or right) side speaker thereof, for example.

Since the mobile phone 100 with music reproduction function according to the above-mentioned embodiment determines whether to stop reproduction of reproducing music data or to continue reproduction thereof as BGM depending on the incoming call processing method stored in the incoming call processing method 309 for the registered communicating partner, it has an effect that a user can have choice to concentrate on his/her talk by stopping reproduction of music depending on a communicating partner, or to enjoy BGM with him/her. Also, since the mobile phone 100 with music reproduction function determines above-mentioned incoming call processing for a non-registered partner, depending on the incoming call processing methods stored in the incoming call processing method storage area 302, it can be set even for a partner who does not communicate so often whether to stop reproduction of reproducing music or to continue reproduction, though uniformly. Further, the mobile phone 100 with music reproduction function automatically stops reproduction of ring tone if a user does not respond to a call within a specified period from a point of receiving a call, it has an effect that consumption of a battery by reproduction of a ring tone is cut down. In this case, if oscillation by a vibrator as well as reproduction of ring tone is used in order to inform an incoming call, the vibrator may be stopped at the same time of stopping the ring tone, thereby producing an effect particularly in terms of cutting down consumption of a battery.

Figure 11:
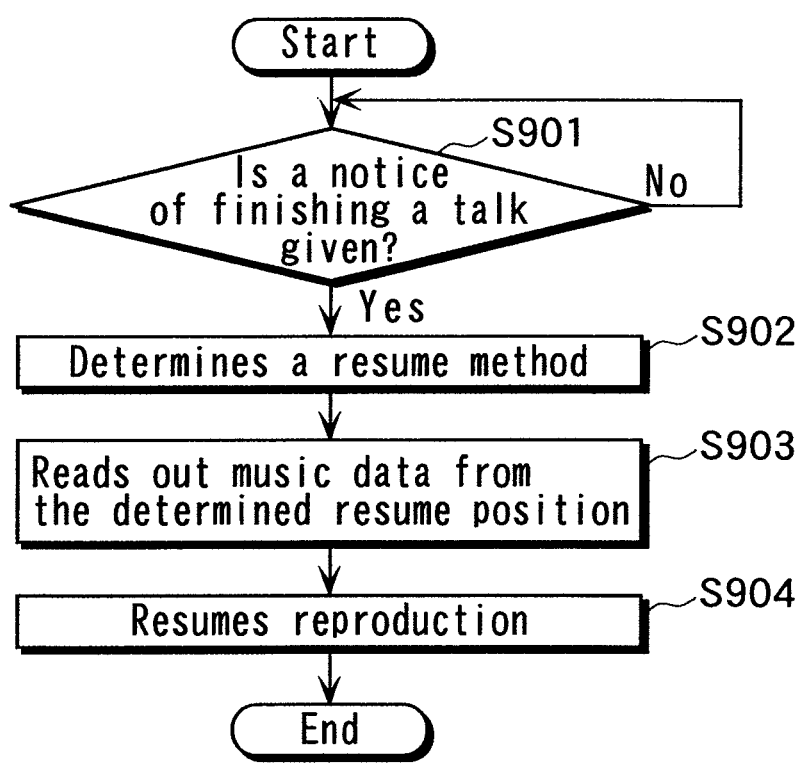
FIG. 11 is a flowchart that describes the operations of the control unit 103 on resuming reproduction of music data after finishing a talk if reproduction of music data is stopped when a call arrives.

FIG. 11 is a flowchart that describes the operations of the control unit 103 on resuming reproduction of music data after finishing a talk if reproduction of music data is stopped when receiving a call.

The control unit 103 waits for a notice of finishing a talk from the communication unit 108 (S901). If there is a notice of finishing a talk, it determines the resume method for resuming reproduction of music data. Here, the resume method is based on the assignment of resume patterns stored in the resume method storage area 304 within the incoming call processing information storage unit 107 (S902). If "1" is stored in the resume method storage area 304, for example, the resume pattern ① is specified.

Next, music data which should be reproduced in the resume method determined in Step S902 is specified. The music data which should be reproduced is specified by the resume file name 311 of the resume information storage area 303 within the incoming call processing information storage unit 107. Further, the control unit 103 specifies the resume position of specified music data. According to the resume pattern ①, for example, it specifies the address which is stored in the incoming call reproduction position information 312 of the incoming call processing information storage unit 107. Next, the control unit 103 instructs the music data readout unit 104 to read out music data from the specified resume position (S903).

Further, the control unit 103 instructs the reproduction unit 106 to reproduce the music data read out by the music data readout unit 104 so as to complete the processing (S904). In response to this instruction, the reproduction unit 106 reproduces music data from the resume position specified in Step S903.

As described above, according to the present embodiment, the mobile phone 100 with music reproduction function resumes reproduction of interrupted music data according to the resume pattern stored in the resume method storage area 304, thereby producing an effect that after finishing a talk, the music data can be reproduced according to the preferred resume pattern which a user selected beforehand even if the reproduction of music is interrupted at a timing unexpected for a user.

Figure 12:
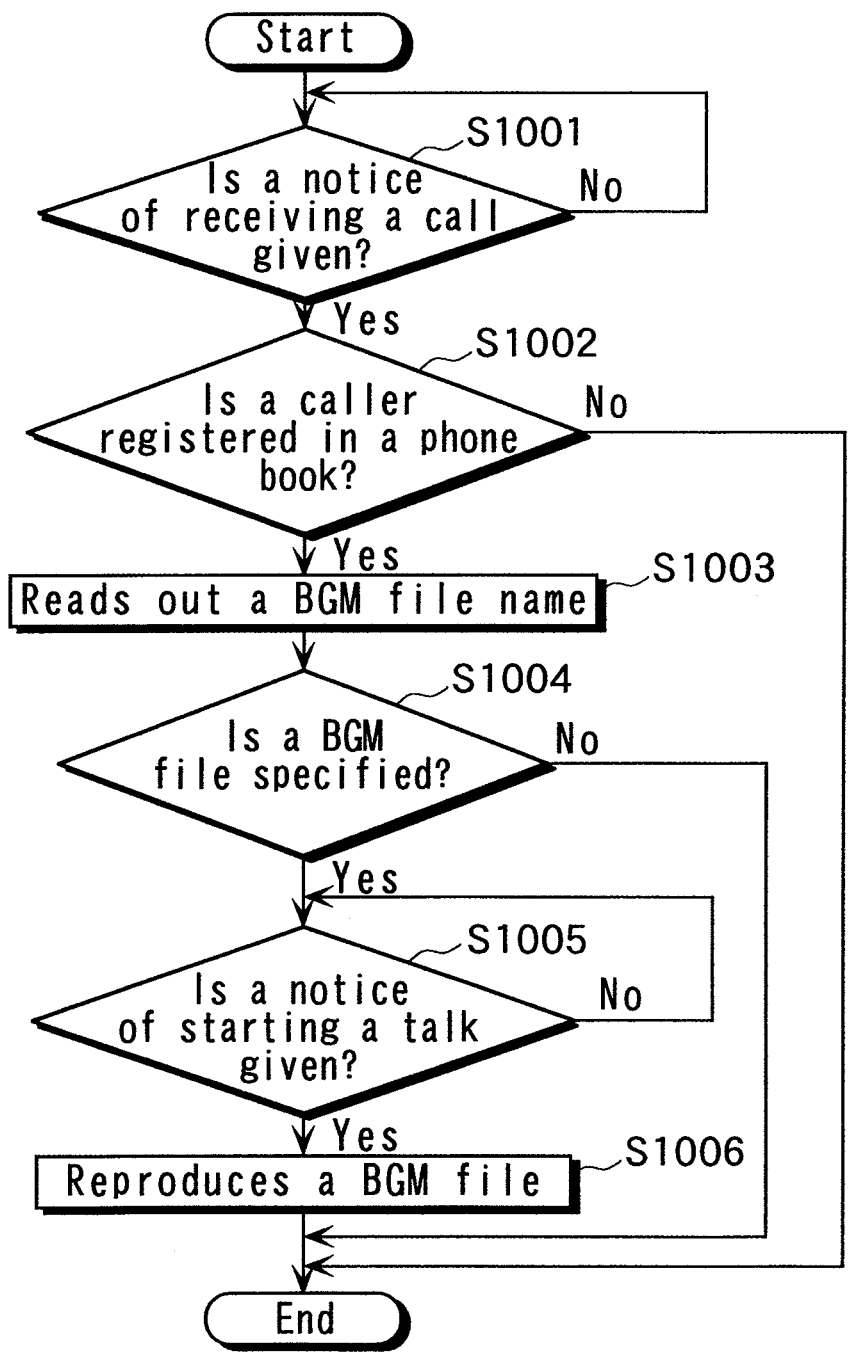
FIG. 12 is a flowchart that shows the operations of the control unit 103 in the case of receiving a call when music data is not being reproduced.

FIG. 12 is a flowchart that shows the operations of the control unit 103 in the case of receiving a call when music data is not being reproduced.

The control unit 103 waits for a notice of receiving a call from the communication unit 108 (S1001). If there is a notice of receiving a call, the control unit 103 examines whether a caller's phone number is registered in the phone number storage area 301 of the incoming call processing information storage unit 107 to determine whether the caller has already been registered in the phone number storage area 301 (S1002). If it is found, as the result of the determination, that the caller is not registered in the phone book storage area 301, the control unit 103 completes the processing.

If it is found, as the result of the determination, that the caller is registered, the control unit 103 reads out the BGM file name 310 for the corresponding registrant 306 within the incoming call processing information storage unit 107 (S1003).

Next, the control unit 103 determines whether the file name is specified or not based on the contents of the read-out BGM file name 310 (S1004). If the content of the read-out BGM file name 310 is "0", for example, it indicates that the file name is not registered, and if the content of the read-out BGM file name 310 is not "0", it is the file name of the music data. The control unit 103 completes the processing, if the file name is not specified as the result of determination in Step S1004.

If the file name is specified as the result of determination in Step S1004, the control unit 103 waits for a notice of starting communication from the communication unit 108 (S1005). When it receives the notice of starting communication from the communication unit 108, it instructs the music data readout unit 104 to read out music data specified in the BGM file name 310, and starts a process of reproducing music data as BGM by instructing the reproduction unit 106 to reproduce the read-out music data as BGM (S1006), thereby completing the processing.

As described above, according to the present embodiment, the mobile phone 100 with music reproduction function can reproduce music data as BGM even if a call arrives while music data is not being reproduced. Further, the mobile phone 100 with music data reproduction function can reproduce the music data specified by a user in the BGM file name 310 as BGM, thereby producing an effect that both a user and his/her communicating partner can enjoy listening to the music data as BGM by selecting the music data corresponding to the partner for the BGM file name 310 such as his/her favorite song.

FIG. 13A is a timing chart that shows the sound volume transition of the music data reproduction sound of the mobile phone 100 with music reproduction function if a user responds to a call within a time specified. FIG. 13B is a timing chart that shows the sound volume transition of the ring tone of the mobile phone 100 with music reproduction function if a user responds to a call within a time specified. In FIG. 13A, the sound volume transition as shown in a full line LA1 indicates the case (1) where a user is reproducing music data when a call arrives and "1" is stored in the incoming call processing method 309 or the incoming call processing method storage area 302 in FIG. 5. The sound volume transition as shown in a dotted line LA2 indicates the case (2) where a user is reproducing music data when a call arrives and "2" is stored in the incoming call processing method 309 or the incoming call processing method storage area 302 in FIG. 5. The sound volume transition as shown in a dashed line LA3 indicates the case (3) where a user is not reproducing music data when a call arrives and "2" is stored in the incoming call processing method 309 in FIG. 5 and the music data is specified in the BGM file name 310. Both FIG. 13A and FIG. 13B indicate the sound volume v on the vertical axis and time t on the horizontal axis.

In the above-mentioned case (1), as shown in a full line LA1, when a user receives a call at a time t=t1 during reproducing music data in volume v=v1 (in Step 801 of FIG. 10), the control unit 103 checks the caller's phone number with the phone number 308 of each of the registrant 306 in the phone number storage area 301 of the incoming call processing information storage unit 107 (Step S802). If they match each other, it reads out the incoming call processing method 309 of the registrant 306 (Step S803), and if they don't match, it reads out the incoming processing method in the incoming processing method storage area 302 (Step S805). If the incoming call processing method "1" is read out (Step S804), the control unit 103 instructs the reproduction unit 106 to fade out the reproduction of music data, instructs the ring tone readout unit 109 to read out the ring tone from the ring tone storage unit 110, and at the same time, instructs the reproduction unit 106 to fade in the reproduction of the read-out ring tone (Step S807). Thereby, the reproduction sound volume of music data v is faded out from v1 to 0 during the time of t1≤t≤t2 as shown in a full line LA1, and at the same time, the sound volume of ring tone is faded in from 0 to v3 during the time of t1≤t≤t2 as shown in FIG. 13B. Next, after finishing the fade-out processing, the control unit 103 instructs the reproduction unit 106 to stop reproducing music data (Step S808), and records the resume file name 311 and the incoming call reproduction position information 312 (Step S809). Thereby, reproduction of music data is stopped (v=0) after the time of t=t2 has passed as shown in a full line LA1, and at the same time, only the ring tone is reproduced at a constant level of sound volume v3 as shown in FIG. 13B. Here, when a user responds to a call by operating the input unit 101 or the like (t=t3) (Step S811), the communication unit 108 stops the processing of reading out the ring tone by the ring tone readout unit 109 so as to start communication. Thereby, the ring tone is stopped at the time of t=t3 as shown in FIG. 13B, and only the communicating voice/sound is outputted until finishing a talk.

Note that here that although the reproduction sound of music data is faded out and the ring tone is faded in at the same timings t1 and t2 of starting and finishing thereof, the reproduction sound of music data can be faded out and the ring tone is faded in at a different timings. For example, the timing of starting fade-out of the reproduction sound of music data may be later than that of starting fade-in of the ring tone, and the timing of finishing fade-in of the ring tone may be earlier than that of finishing fade-out of the reproduction sound of music data, and vice versa. Also, the fade-out speed of reproduction sound of music data may be faster than the fade-in speed of ring tone, and vice versa. Further, a user can adjust the fade-in/fade-out timings and speed. In addition, although the ring tone is stopped at the time of t=t3 by starting communication, the ring tone can be fade out.

When a call is finished by a user's operation of the input unit 101 (t=t4), the communication unit 108 transmits a notice of finishing a talk to the control unit 103. When the control unit 103 receives a notice of finishing a talk (Step S901 in FIG. 11), it has the reproduction unit 106 reproduce the music data which was being reproduced when a call arrived (Step S904) according to the resume pattern stored in the resume method storage area 304 of the incoming call processing information storage unit 107 (Steps S902 and S903). Thereby, as shown in a full line LA1, reproduction of music data which was stopped during a talk (sound volume v=0) is resumed at the volume v1 which is the sound volume when music data is reproduced after finishing a talk (t=t4) and on receiving a call (t=t1). Note that although, in this case, the processing for controlling the sound volume is not executed when reproduction of music data is started by the resume processing, the fade-in processing may be executed when reproduction of music data is started by the resume processing.

In the above case (2), as shown in a dotted line LA2, if a call arrives at the time t=t1 while a user is reproducing music data at the sound volume v=v1 (Step S801 in FIG. 10), the control unit 103, as it does in the case (1), reads out the incoming call processing method 309 of the registrant 306 (Step S803) if the caller's phone number matches the phone number 308 of the registrant 306 (Step S802). If they do not match each other, it reads out the incoming call processing method of the incoming call processing method storage area 302 (Step S805). If the incoming call processing method "2" is read out (Step S804), the control unit 103 instructs the reproduction unit 106 to tune down the sound volume of the reproducing music data gradually to that for reproducing BGM, instructs the ring tone readout unit 109 to read out the ring tone from the ring tone storage unit 110, and further instructs the reproduction unit 106 to fade in reproduction of the read-out ring tone (Step S806). Thereby, the reproduction sound of music data is, as shown in a dotted line LA2, gradually tuned down from the sound volume v1 to a specified volume v2 during the time of t1≤t≤t2 from the point of receiving a call, and after t2≤t, the music data is reproduced as BGM at the constant sound volume v2. On the other hand, the ring tone is faded in while it is being mixed with BGM reproduction sound, as shown in FIG. 13B during the time of t1≤t≤t2, and after reaching a specified sound volume v3 at the time of t=t2, it is reproduced at the sound volume v3. Here, if a user responds to a call (t=t3) (Step S811), the communication unit 108 executes the processing to stop reading out a ring tone by the ring tone readout unit 109 so as to start communication. The BGM reproduction sound of music data is mixed with the communicating voice/sound and reproduced, and outputted from the headphones 3 or the speaker 6, and at the same time transmitted to the user's communicating partner. Thereby, as shown in FIG. 13B, the ring tone is stopped at the time of t=t3. In this case, too, the ring tone may be faded out instead of being stopped.

When a call is finished (t=t4), the communication unit 108 transmits a notice of finishing a talk to the control unit 103. The control unit 103 instructs the reproduction unit 106 to tune up the BGM reproduction sound volume of music data to the volume on receiving a call if the BGM reproduction is being done when a call is finished. Thereby, as shown in a dotted line LA2, the BGM reproduction sound volume of music data v2 is returned to the reproduction sound volume of music data on receiving a call v1. Note that, in this case, the BGM reproduction sound volume v2 may be, of course, tune up gradually to the sound volume on receiving a call v1.

Note that although BGM reproduction sound of music data is mixed with talking sound and reproduced in this embodiment, BGM reproduction sound need not always be mixed with communicating voice/sound, and the communicating voice/sound may be outputted from the right (or the left) speaker of the headphones 3 and the BGM reproduction sound of music data from the left (or the right) speaker thereof, for example.

Further, although, in this embodiment, the BGM reproduction sound of music data is also transmitted to the user's communicating partner, the mobile phone with music reproduction function of the present invention is not limited thereto. The BGM reproduction sound of music data along with the communicating voice/sound may be outputted from the headphones 3 or the speaker 6 only without being transmitted to the user's communicating partner. Thereby, there produces an effect that, when the user of the mobile phone with music reproduction function of the present invention has a call, if the receiver is also the user of the mobile phone with music reproduction function, the receiver can also enjoy BGM reproduction of other music data than the music data that the caller is listening to during a talk. Further, a user may set whether or not the BGM reproduction sound is transmitted to his/her communicating partner for each of his/her mobile phone. In addition, a user can set it for each partner.

In the above case (3), a user does not reproduce music data when he/she receives a call. When the control unit 103 receives a notice of receiving a call from the communication unit 108 (t=t1) (Step S1001 in FIG. 12), it instructs the ring tone readout unit 109 to read out the ring tone, and instructs the reproduction unit 106 to fade in the reproduction of the read-out ring tone. Thereby, the ring tone is fade in as shown in FIG. 13B during the time of t1≤t≤t2 from the point of receiving a call, being reproduced at the sound volume v3 when it reaches a specific volume v3 at the time of t=t2.

The control unit 103 checks the caller's phone number and the phone number 308 of each registrant 306 (Step S1002), and if they match each other, it reads out the incoming call processing method 309 of the registrant 306, and if the read-out incoming call processing method 309 is "2", it reads out the BGM file name 310 (Step S1003). The control unit 103 waits for a notice of starting communication from the communication unit 108 (Step S1005) since the read-out BGM file name 310 is not "0" (Step S1004), and when it receives a notice of starting communication (t=t3), it instructs the music data readout unit 104 to read out the tune data 203 of the read-out BGM file name 310 from the music data recording medium 105 and further instructs the reproduction unit 106 to reproduce the read-out tune data 203 as BGM (Step S1006). The ring tone is stopped by the process of the communication unit 108.

Thereby, the ring tone is stopped as shown in FIG. 13B when a call starts (t=t3), and on the other hand, as shown in a dashed line LA3, the BGM reproduction of the tune data 203 specified in the BGM file name 310 is started (v=v2) and mixed with the talking sound. The mixed BGM reproduction sound is outputted from the headphones 3 or the speaker 6 and transmitted to the user's communicating partner. Note that, in this embodiment, the BGM reproduction of the tune data 203 specified in the BGM file name 310 may also be faded in. Also, although the BGM reproduction of the tune data 203 is started in wait for starting communication in the above embodiment, the present invention is not limited to this, the BGM reproduction or fade-in thereof may be started at the time of receiving a call (t=t1) or an appropriate point of time after receiving a call (t1≤t≤t3). Further, although the above embodiment describes the BGM reproduction during a talk if the mobile phone 100 with music reproduction function receives a call, the present invention is not limited to this embodiment, and the BGM reproduction during a talk may be done even if the user of the mobile phone 100 with music reproduction function is a caller. In this case, the BGM reproduction sound can be mixed with the communicating voice/sound so as to be transmitted to the communicating partner or need not be transmitted.

After a call is finished (t=t4), the control unit 103 instructs the music data readout unit 104 to stop reading out the tune data 203 from the music data recording medium 105, and further instructs the reproduction unit 106 to stop reproducing music data. Thereby, as shown in a dashed line LA3, the BGM reproduction of music data is stopped (v=0). Note that, even in this case, the BGM reproduction of the tune data 203 may, of course, be faded out when it is stopped.

As described above, the mobile phone 100 with music reproduction function of the present invention fades out the reproducing music on receiving a call and at the same time, fades in the ring tone, thereby producing an effect that a user who is reproducing music can distinguish it from the ring tone more comfortably. In addition, the mobile phone 100 with music reproduction function offers various processes on receiving a call, during a talk and after finishing a talk, respectively, thereby producing an effect that it can meet users' diversified needs which may arise because it has both functions of music reproduction player and a mobile phone.

FIG. 14A is a timing chart that shows the sound volume transition of the music data reproduction sound of the mobile phone 100 with music reproduction function if a user does not respond to a call within the time specified Δt. FIG. 14B is a timing chart that shows the volume transition of the ring tone of the mobile phone 100 with music reproduction function if a user does not respond to a call within the time specified Δt. In FIG. 14A, the sound volume transition as shown in a full line la1 is same as the sound volume transition (1) as shown in FIG. 13A. The sound volume transition as shown in a dotted line la2 is same as the sound volume transition (2) as shown in FIG. 13A. The sound volume transition as shown in a dashed line la3 is same as the sound volume transition (3) as shown in FIG. 13A. Therefore, since the sound volume transitions on receiving a call (t1≤t≤t2) as shown in FIG. 14A and FIG. 14B are same as those on receiving a call (t1≤t≤t2) as shown in FIG. 13A and FIG. 13B, explanation thereof will be omitted. Note that t5=t1+Δt here.

In the case (1), although only the ring tone is being reproduced at a constant sound volume (v=v3) (t2≤t<t5), a user does not respond to a call even after the specified time Δt has passed (t=t5) since the call arrived (Step S811 in FIG. 11). In this case, the control unit 103 instructs the reproduction unit 106 to fade out the ring tone, reads out the file name of the music data which was being reproduced on receiving a call (the resume file name 311), instructs the music data readout unit 104 to read out the music data of the read-out file name from the beginning thereof, and instructs the reproduction unit 106 to fade in and mix the read-out music data with the ring tone so as to start reproduction thereof. After the fade-out of the ring tone is completed (t=t6), the control unit 103 instructs the ring tone readout unit 109 to stop reading out the ring tone, and instructs the reproduction unit 106 to stop reproduction of the ring tone (Step S812). On the other hand, when the reproduction sound of the music data which is being faded in reaches the sound volume on receiving a call (v=v1) (t=t6), the control unit 103 instructs the reproduction unit 106 to reproduce the music data at the said sound volume v1.

Thereby, at the same time when the ring tone is faded out as shown in FIG. 14B (t5≤t≤t6, v3≥v≥0), the reproduction of the music data which was stopped on receiving a call is faded in again as shown in a full line la1 in FIG. 14A (t5≤t≤t6, 0≤v≤v1), returning to the reproduction condition on receiving a call. Note that although the reproduction of the music data which was stopped on receiving a call is resumed from the beginning thereof according to the present embodiment, the present invention is not limited to this embodiment, it may be resumed at the resume position based on other resume patterns, or may be resumed at the resume position based on the resume patterns stored in the resume method storage area 304.

In the case (2), if a user does not respond to a call even after the specified time Δt has passed from the point of receiving a call (t=t5) while the ring tone at a certain volume (v=v3) is being reproduced with mixed with the BGM reproduction sound (v=v2) (t2≤t<t5), the control unit 103 instructs the reproduction unit 106 to fade out the ring tone, and then instructs it to tune up the BGM reproduction sound volume of the music data v2 to the volume v1 on receiving a call. Next, after the fade-out of the ring tone is finished (t=t6), the control unit 103 instructs the ring tone readout unit 109 to stop reading out the ring tone, and instructs the reproduction unit 106 to stop reproducing the ring tone.

Thereby, as shown in FIG. 14B, at the same time when the ring tone is faded out as mentioned above (t5≤t≤t6, v3≥v≥0), the sound volume of the music data which was being reproduced as BGM v2 is tuned up gradually to the sound volume v1 on receiving a call (t5≤t≤t6, v2≤v≤v1), as shown in a dotted line lag in FIG. 14A, returning to the reproduction condition at the point of receiving a call.

In the case (3), the control unit 103 executes the processing corresponding to Step S1001 through Step S1005 in FIG. 12 after the communication unit 108 gives a notice of starting a talk. However, since the reproduction condition returns to that at the point of receiving a call before the communication unit 108 gives a notice of receiving a call, the BGM reproduction of music data is not done accordingly, and only the ring tone is reproduced as shown in FIG. 14B.

As described above, according to the present embodiment, the mobile phone 100 with music reproduction function once executes the incoming call processing based on the incoming call processing method 309 or in the incoming call processing method storage area 302 when it receives a call. Since it automatically returns the reproduction of music data to the condition before receiving a call if a user does not respond to a call within a specified time Δt, the user may just leave a call not responded if he/she has no will to respond to it or need not respond it by return as long as he/she can check receipt of a call and the caller's phone number, thereby producing an effect that a user need not bother to operate the input unit 101 to return to the original condition and therefore it is very convenient for him/her.

Note that above-mentioned embodiment is just an explanatory example of a system which promises the best effect under the present situation. The present invention may be embodied in other specific forms without departing from the spirit thereof. Specifically, the present invention may be embodied in the following forms:

Although the music data recording medium 105 is described as a portable semiconductor memory according to the present embodiment, the present invention is not limited to this, and it can be replaced with a small-sized hard disk other than a portable semiconductor memory, a built-in memory of the mobile phone 100 with music reproduction function or the like.

Although 3 types of resume patterns are explained according to the present embodiment, the present invention is not, of course, limited to this. Also, although the resume pattern selected by a user's input is stored in the resume method storage area 304 according to the present embodiment, the present invention is not limited to this, and the mobile phone 100 with music reproduction function may select the resume pattern at random.

Note that although it is assumed in the present embodiment that the music data obtained via electronic music distribution is recorded in the music data recording medium 105 so as to be reproduced, the present invention is not limited to this. For example, ambient sound which a user himself/herself recorded or obtained in another way such as conversation in conference, babbling sound of a stream, noise of busy train station is converted into a file format and recorded in the music data recording medium 105 along with the above-mentioned music data, and the file thereof may be reproduced as BGM.

Although the sound volume is tuned down to a specified volume when the music data is reproduced as BGM in the above-mentioned embodiment, the present invention is not limited to this, and even in the BGM reproduction thereof, the music data can be just mixed with the communicating voice/sound and reproduced at the same volume as it was before receiving a call. In this case, a user can control the BGM reproduction sound volume by operating the volume control buttons on the music reproduction control key unit 9 or the music reproduction control key unit 13. Or, a user can set the BGM reproduction sound volume beforehand.

Note that although the ring tone is always reproduced in the above-mentioned embodiment on the assumption that a user responds to a call when a call arrives, the present invention is not limited to this, and the ring tone need not be reproduced depending on a caller. In this case, a user registers the phone number of the caller whom the user will not respond to in the phone number 308 of the phone book storage area 301, stores "0", for example, in the incoming call processing method 309 for the registrant. The control unit 103 examines the phone book storage area 301 when a call arrives, and if the incoming call processing method 309 is "0", completes the incoming processing without executing any processing. Thereby, since the sound volume of the music data is not tuned down even if the music data is being reproduced on receiving a call without reproduction of the ring tone, a user, if he/she knows the caller's phone number, can register it and store "0" in the incoming call processing method 309, thereby producing an effect that a user can enjoy music without being bothered by a silent call, nuisance call or a call from an unwelcome person.

INDUSTRIAL APPLICABILITY

Although a mobile phone is described in the form of the present embodiment, the present invention is applicable to a mobile phone with a music reproduction function, a PDA (personal digital assistant) with a music reproduction function or a phone function, and a portable communication device with a music reproduction function and a phone function.

The invention claimed is:

1. A mobile phone with a music reproduction function, said mobile phone comprising:
a reproduction unit operable to reproduce music data;
an incoming call detection unit operable to detect an incoming call from outside;
a ring tone output unit operable to output a ring tone;
a stop unit operable to instruct said reproduction unit to stop reproduction of the music data after gradually reducing a volume of the music data, and to instruct said ring tone output unit to output a ring tone while gradually increasing a volume of the ring tone, when said incoming call detection unit detects an incoming call while said reproduction unit is reproducing the music data;
a resume method storage unit operable to store information indicating at least two reproduction resume methods for resuming reproduction of the music data interrupted by the incoming call at different positions of the music data; and
a control unit operable to select one of the at least two reproduction resume methods stored in said resume method storage unit, to specify a reproduction start position of the music data based on the selected reproduction resume method, and to instruct said reproduction unit to reproduce the music data from the specified reproduction start position, after reproduction is stopped by said reproduction unit in accordance with the instruction from said stop unit and a conversation finishes,
wherein the at least two reproduction resume methods include at least one of a method to reproduce the music data from a beginning of the music data which was being reproduced just before being stopped, a method to reproduce the music data from a point at which the reproduction of the music data was stopped, and a method to jump back to the music data for a specified time from a point at which the reproduction of the music data was stopped and to restart the reproduction of the music data at the point.

2. The mobile phone according to claim 1, further comprising:
a storage unit operable to store a list in which a communicating partner registered beforehand is corresponded to incoming call processing information indicating per communicating partner whether or not to stop reproduction of music data when a call arrives during reproduction of music data,
wherein said control unit specifies a communicating partner who is a caller of an incoming call detected by the incoming call detection unit, and instructs, via said stop unit, said reproduction unit to stop reproduction of the music data after gradually reducing the volume of the music data when the incoming call processing information corresponding to a specified communicating partner indicates a stop of reproduction of music data.

3. The mobile phone according to claim 2,
wherein the list is a phone book list in which a phone number of a communicating partner registered beforehand is corresponded to the incoming call processing information, and
said control unit compares a caller's phone number of an incoming call detected by the incoming call detection unit with the phone number stored in said storage unit, and if the phone numbers match with each other as a result of comparison, instructs, via said stop unit, said reproduction unit to stop reproduction of the music data after gradually reducing the volume of the music data when the incoming call processing information corresponding to the phone number indicates a stop of reproduction of music data.

4. The mobile phone according to claim 1,
wherein said control unit comprises an elapsed time counting unit that counts an elapsed time from a point of receiving a call, instructs, via said stop unit, said ring tone output unit to stop outputting the ring tone after gradually reducing the volume of the ring tone when a conversation does not start within a specified time elapsed after said incoming call detection unit detects an incoming call, and instructs said music reproduction unit to resume reproduction of the music data by gradually increasing the volume of the music data.

5. The mobile phone according to claim 1,
wherein said control unit, via said stop unit, instructs said ring tone output unit to start gradually increasing the volume of the ring tone at the same time when said reproduction unit starts gradually reducing the volume of the music data.

6. The mobile phone according to claim 1,
wherein said control unit, via said stop unit, instructs said ring tone output unit to start gradually increasing the volume of the ring tone after said reproduction unit completes gradually reducing the volume of the music data.

7. The mobile phone according to claim 1,
wherein said control unit, via said stop unit, instructs said ring tone output unit to start gradually increasing the volume of the ring tone after said reproduction unit starts gradually reducing the volume of the music data.

8. A music data reproduction method by of a mobile phone with a music reproduction function for storing information indicating at least two reproduction resume methods for resuming reproduction of music data interrupted by an incoming call at different positions of the music data in a memory in advance, said music data reproduction method comprising:
reproducing music data;
detecting an incoming call from outside;
temporarily stopping reproduction of the reproduced music data after gradually reducing a volume of the music data, and outputting a ring tone while gradually increasing a volume of the ring tone, when an incoming call is detected while the music data is being reproduced; and
selecting one of the at least two reproduction resume methods for resuming reproduction of the music data interrupted by the incoming call at different positions of the music data stored in the memory, specifying a reproduction start position of the music data based on the selected reproduction resume method, and resuming reproduction of the music data from the specified reproduction start position, after reproduction is stopped and a conversation finishes,
wherein the at least two reproduction resume methods include at least one of a method to reproduce the music data from a beginning of the music data which was being reproduced just before being stopped, a method to reproduce the music data from a point at which the reproduction of the music data was stopped, and a method to jump back to the music data for a specified time from a point at which the reproduction of the music data was stopped and to restart the reproduction of the music data at the point.

9. A non-transitory computer readable recording medium having a computer program stored thereon for execution by a computer of a mobile phone with a music reproduction function for storing information indicating at least two reproduction resume methods for resuming reproduction of music data interrupted by an incoming call at different positions of the music data in a memory in advance, the computer program causing the computer of the mobile phone to execute a method comprising:
reproducing music data;
detecting an incoming call from outside;
temporarily stopping reproduction of the reproduced music data after gradually reducing a volume of the music data, and outputting a ring tone while gradually increasing a volume of the ring tone, when an incoming call is detected while the music data is being reproduced; and
selecting one of the at least two reproduction resume methods for resuming reproduction of the music data interrupted by the incoming call at different positions of the music data stored in the memory, specifying a reproduction start position of the music data based on the selected reproduction resume method, and resuming reproduction of the music data from the specified reproduction start position, after reproduction is stopped and a conversation finishes,
wherein the at least two reproduction resume methods include at least one of a method to reproduce the music data from a beginning of the music data which was being reproduced just before being stopped, a method to reproduce the music data from a point at which the reproduction of the music data was stopped, and a method to jump back to the music data for a specified time from a point at which the reproduction of the music data was stopped and to restart the reproduction of the music data at the point.

* * * * *